(12) United States Patent
Imamura

(10) Patent No.: US 11,370,393 B2
(45) Date of Patent: Jun. 28, 2022

(54) WIPER DEVICE

(71) Applicant: DENSO CORPORATION, Kariya (JP)

(72) Inventor: Takayuki Imamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 104 days.

(21) Appl. No.: 16/845,179

(22) Filed: Apr. 10, 2020

(65) Prior Publication Data
US 2020/0331434 A1  Oct. 22, 2020

(30) Foreign Application Priority Data

Apr. 18, 2019  (JP) .............................. JP2019-079498

(51) Int. Cl.
| | |
|---|---|
| *B60S 1/16* | (2006.01) |
| *B60S 1/08* | (2006.01) |
| *B60S 1/04* | (2006.01) |
| *B60S 1/34* | (2006.01) |

(52) U.S. Cl.
CPC . *B60S 1/16* (2013.01); *B60S 1/08* (2013.01); *B60S 1/043* (2013.01); *B60S 1/3436* (2013.01)

(58) Field of Classification Search
CPC ...... B60S 1/32; B60S 1/34; B60S 1/16; B60S 1/08; B60S 1/22; B60S 1/3436
USPC ...... 15/250.31, 250.19, 250.33, 250.34, 97.3
See application file for complete search history.

(56) References Cited

U.S. PATENT DOCUMENTS

| | | | | |
|---|---|---|---|---|
| 5,564,156 | A | * 10/1996 | Habba | ....................... B60S 1/16 |
| | | | | 15/250.25 |
| 2011/0078868 | A1 | 4/2011 | Wegner et al. | |
| 2014/0317870 | A1 | 10/2014 | Wegner et al. | |
| 2017/0151933 | A1* | 6/2017 | Doorley | .................... B08B 1/00 |

FOREIGN PATENT DOCUMENTS

| | | | | |
|---|---|---|---|---|
| JP | S59145647 A | * | 8/1984 | ............... B60S 1/32 |
| JP | 2011-506169 A | | 3/2011 | |
| KR | 20030049075 A | * | 6/2003 | |

* cited by examiner

*Primary Examiner* — Katina N. Henson
(74) *Attorney, Agent, or Firm* — Oliff PLC

(57) ABSTRACT

A wiper device including a wiper member that includes a wiper arm to which a wiper blade is coupled, a base end portion of the wiper arm being supported by a support section provided at a vehicle, and the wiper member being configured to of undergo displacement relative to the vehicle, a drive wheel that is rotatably supported by the wiper member at a position of the wiper member which is separated from the support section, and that rolls across a running face provided at the vehicle so as to displace the wiper member relative to the vehicle, and a motor that is supported by the wiper member so as to undergo displacement together with the wiper member, and that drives rotation of the drive wheel.

17 Claims, 28 Drawing Sheets

WIPER DEVICE

CROSS-REFERENCE TO RELATED APPLICATION

This application is based on and claims priority under 35 USC 119 from Japanese Patent Application No. 2019-079498 filed on Apr. 18, 2019, the disclosure of which is incorporated by reference herein.

BACKGROUND

Technical Field

The present disclosure relates to a wiper device.

Related Art

A direct drive device for a window wiper disclosed in Japanese National-Phase Publication No. 2011-506169 includes a drive motor that directly drives a wiper shaft fixed to a wiper arm, without the use of a link mechanism.

SUMMARY

In the Related Art described above, the absence of a link mechanism, which would require a large installation space, facilitates installation to a vehicle (for example inside a front cowl). However, due to the lack of the torque amplification that a link mechanism would provide, a greater drive torque is demanded of the drive motor, resulting in a larger drive motor. This may result in constraints when installing the drive motor in the vehicle.

In consideration of the above circumstances, an object of the present disclosure is to provide a wiper device capable of greatly reducing constraints on installation.

A wiper device of a first aspect of the present disclosure includes a wiper member, a drive wheel, and a motor. The wiper member includes a wiper arm to which a wiper blade is coupled, a base end portion of the wiper arm being supported by a support section provided at a vehicle. The wiper member is configured to undergo displacement relative to the vehicle. The drive wheel is rotatably supported by the wiper member at a position of the wiper member which is separated from the support section, and rolls across a running face provided at the vehicle so as to displace the wiper member relative to the vehicle. The motor is supported by the wiper member so as to undergo displacement together with the wiper member, and drives rotation of the drive wheel.

According to the wiper device of the first aspect, the wiper member including the wiper arm to which the wiper blade is coupled is supported by the support section provided at the vehicle at the base end portion of the wiper arm so as to enable the wiper member to undergo displacement relative to the vehicle. The drive wheel and the motor are supported by the wiper member. The drive wheel is rotation driven by the motor so as to roll across the running face provided at the vehicle. The wiper member is thus displaced relative to the vehicle. Moreover, since the drive wheel and the motor described above are supported by the wiper member at a position which is separated from the support section, there is no need to install a motor or the like in the vehicle (for example within a front cowl). This enables constraints on installation to be greatly reduced.

A wiper device of a second aspect of the present disclosure includes a wiper member, a drive wheel, and a motor. The wiper member includes a wiper arm to which a wiper blade is coupled, a base end portion of the wiper arm being supported by a support shaft provided at a vehicle. The wiper member is configured to pivot about the support shaft. The drive wheel is supported by the wiper member so as to be capable of rolling across a running face, the running face provided at the vehicle in a circular arc shape concentric to the support shaft. The motor is supported by the wiper member and drives rotation of the drive wheel.

According to the wiper device of the second aspect, the wiper member including the wiper arm to which the wiper blade is coupled is supported by the support shaft provided at the vehicle at the base end portion of the wiper arm so as to enable the wiper member to pivot about the support shaft. The drive wheel and the motor are supported by the wiper member. The drive wheel is rotation driven by the motor so as to roll across the running face provided at the vehicle. The running face has a circular arc shape concentric to the support shaft, and the wiper member pivots relative to the vehicle about the support shaft due to the rolling described above. Moreover, since the drive wheel and the motor described above are supported by the wiper member, there is no need to install a motor or the like in the vehicle (for example within a front cowl). This enables constraints on installation to be greatly reduced.

A wiper device of a third aspect of the present disclosure is the first aspect, wherein the support section is a support shaft and the wiper member is configured to pivot about the support shaft.

According to the wiper device of third aspect, the base end portion of the wiper arm is supported by the support shaft provided at the vehicle, and the wiper member is configured to pivot about the support shaft. This enables the configuration of the support section to be reduced in size and also simplified in comparison to cases in which, for example, the wiper member is supported so as to be capable of sliding relative to the vehicle. Moreover, since the drive wheel is disposed at a position of the wiper member at a separation from the support section, the motor can be set with a smaller torque than in configurations in which, for example, rotation of a support shaft is directly driven by a motor. This enables a reduction in size and a reduction in power consumption of the motor.

A wiper device of a fourth aspect of the present disclosure is the first aspect, wherein the running face is provided at a windshield to be wiped by the wiper blade.

According to the wiper device of the fourth aspect, the drive wheel supported by the wiper member rolls across the running face provided at the windshield of the vehicle to be wiped by the wiper blade of the wiper member. This enables a reduction in the number of components in comparison to cases in which the running face is provided at a separate additional member.

A wiper device of a fifth aspect of the present disclosure is the first aspect, wherein the running face is provided at a rail member attached to the vehicle separately to a windshield to be wiped by the wiper blade.

According to the wiper device of the fifth aspect, the drive wheel supported by the wiper member rolls across the running face provided at the rail member. The rail member is attached to the vehicle separately to the windshield of the vehicle to be wiped by the wiper blade. Providing the running face to the rail member that is separate to the windshield of the vehicle in this manner enables, for example, the degrees of freedom with regard to settings of the running face to be increased.

A wiper device of a sixth aspect of the present disclosure is the first aspect, wherein a rotation axial direction of the drive wheel runs in a length direction of the wiper member.

In the wiper device of the sixth aspect, the above configuration enables the drive wheel to roll across the running face when the running face is, for example, provided on a surface of a windshield of the vehicle.

A wiper device of a seventh aspect of the present disclosure is the first aspect, wherein a rotation axial direction of the drive wheel runs in a direction intersecting both a length direction of the wiper member and a direction of displacement of the wiper member.

In the wiper device of the seventh aspect, the above configuration enables the degrees of freedom with regard to settings of the running face to be increased in cases in which, for example, the running face is provided at a rail member separate to a windshield of the vehicle.

A wiper device of an eighth aspect of the present disclosure is the first aspect, wherein the drive wheel is supported by the wiper member via the motor.

In the wiper device of the eighth aspect, the motor is supported by the wiper member, which in turn is supported by the support section provided at the vehicle, and the drive wheel is supported by the motor. This enables a simpler configuration than in cases in which the motor and the drive wheel are each supported by the wiper member separately.

A wiper device of a ninth aspect of the present disclosure is the eighth aspect, wherein the motor is supported by the wiper member via a suspension device that elastically displaces the drive wheel and the motor with respect to the wiper member in response to a reaction force received by the drive wheel from the running face.

In the wiper device of the ninth aspect, the drive wheel is supported by the motor that is in turn supported by the wiper member via the suspension device. The suspension device elastically displaces the drive wheel and the motor with respect to the wiper member in response to the reaction force received by the drive wheel from the running face provided at the vehicle. This enables the drive wheel rolling across the running face to make consistent close contact with (follow) the running face.

A wiper device of a tenth aspect of the present disclosure is the eighth aspect, wherein the wiper arm includes an arm head supported by the support section and a retainer coupled to the arm head so as to be pivotable relative to the arm head, and the motor is supported by the arm head.

In the wiper device of the tenth aspect, in the wiper arm of the wiper member the motor is supported by the arm head that is in turn supported by the support section provided at the vehicle, and the drive wheel is supported by the motor. This enables pre-existing components to be employed for configurations of the wiper member that are positioned away from the support section.

A wiper device of an eleventh aspect of the present disclosure is the first aspect, wherein a portion of the drive wheel configured to contact the running face is made from a rubber-like material.

According to the wiper device of the eleventh aspect, the portion of the drive wheel made from a rubber-like material contacts the running face. This enables the drive wheel to be prevented or suppressed from slipping against the running face.

A wiper device of a twelfth aspect of the present disclosure is the first aspect, further including a position sensor configured to detect a position of the wiper member relative to the vehicle, and a control section configured to control actuation of the motor based on a detection result of the position sensor.

In the wiper device of the twelfth aspect, the position of the wiper member relative to the vehicle is detected by the position-finding sensor, and the control section controls actuation of the motor based on the detection result of the position-finding sensor. This enables positional misalignment of the wiper member, for example due to the drive wheel slipping against the running face, to be corrected.

A wiper device of a thirteenth aspect of the present disclosure is the first aspect, further including an auxiliary wheel that is rotatably supported by the wiper member, such that a location for forming the running face on the vehicle is interposed between the drive wheel and the auxiliary wheel.

In the wiper device of the thirteenth aspect, the location for forming the running face on the vehicle is interposed between the drive wheel and the auxiliary wheel rotatably supported by the wiper member. This enables the drive wheel to be pressed consistently against the running face.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
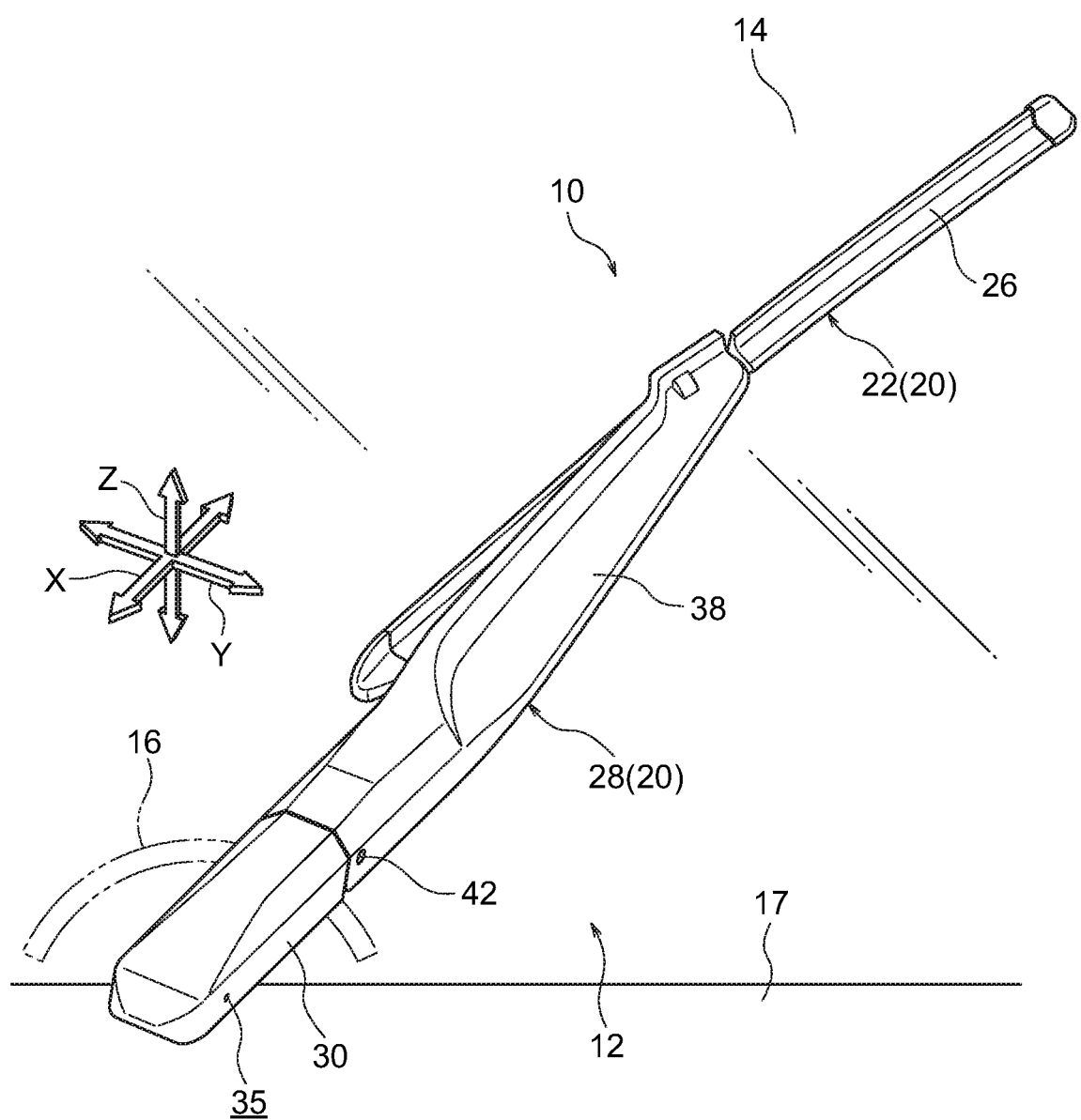
FIG. 1 is a perspective view illustrating a wiper device according to a first exemplary embodiment of the present disclosure.
Figure 2:
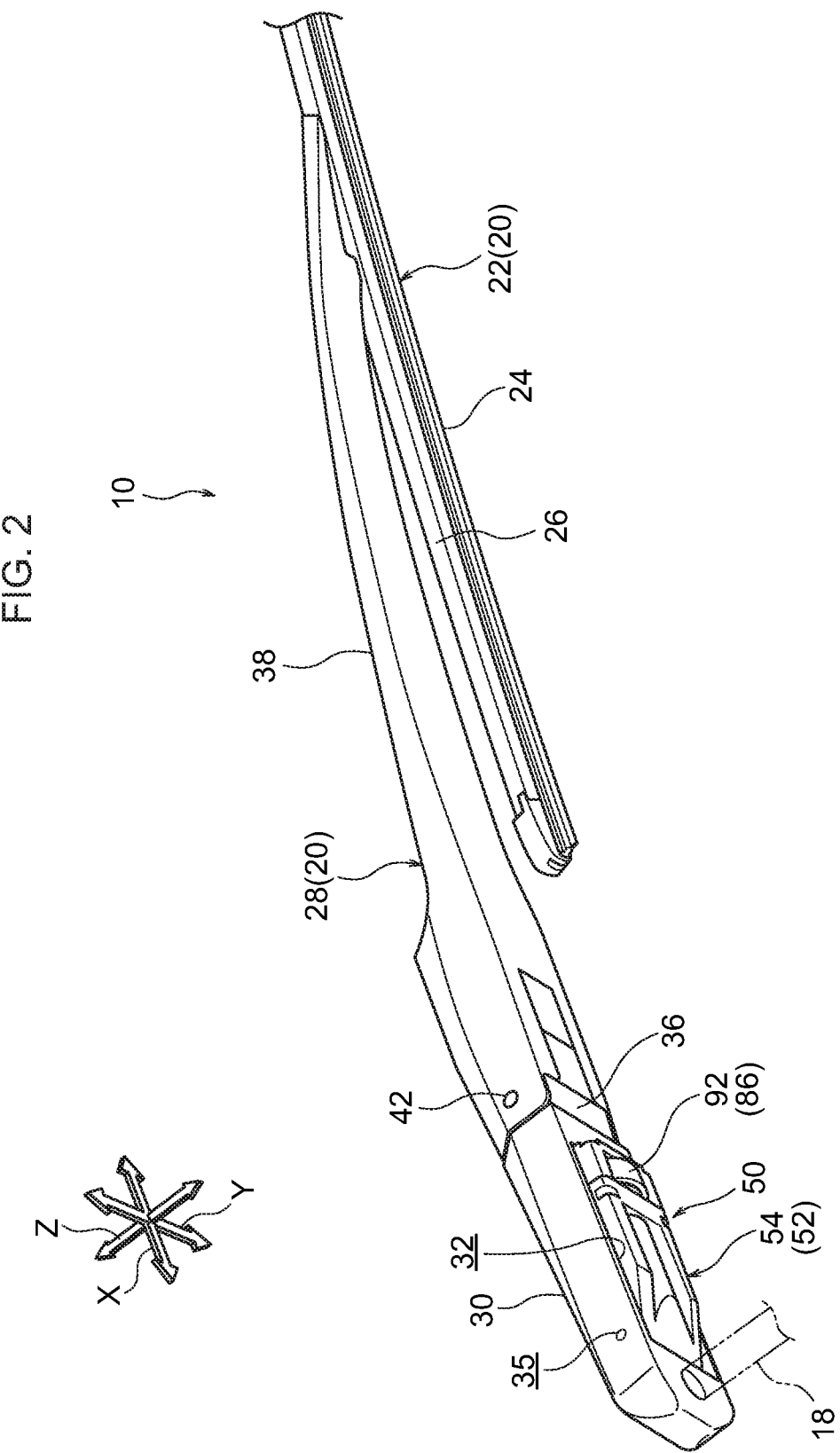
FIG. 2 is a perspective view illustrating a wiper device according to the first exemplary embodiment as viewed from a different angle to FIG. 1.
Figure 3:
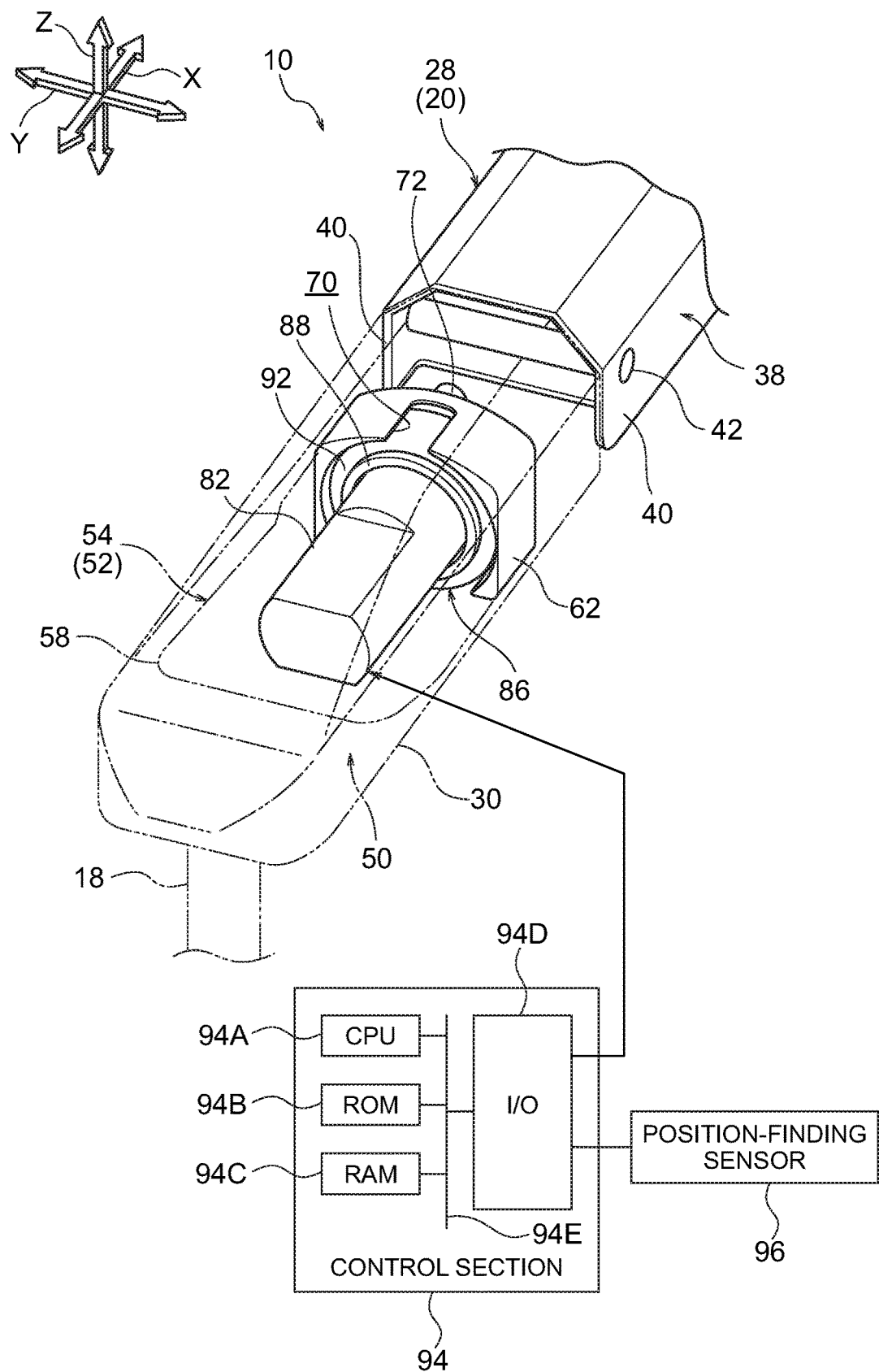
FIG. 3 is an enlarged perspective view illustrating part of the configuration illustrated in FIG. 1 with an arm head illustrated in a transparent state.
Figure 4:
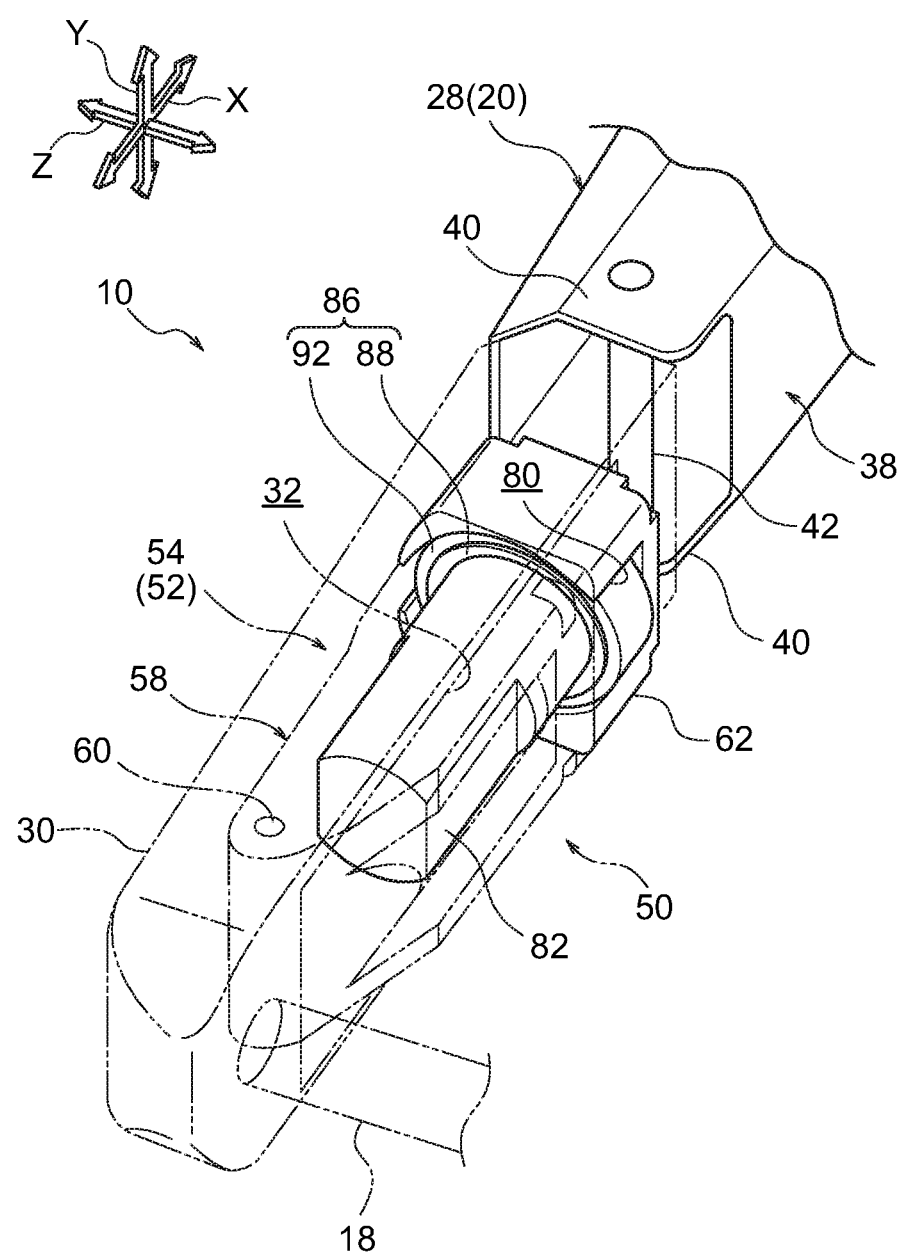
FIG. 4 is a perspective view illustrating the configuration illustrated in FIG. 3 as viewed from a different angle to FIG. 3.
Figure 5:
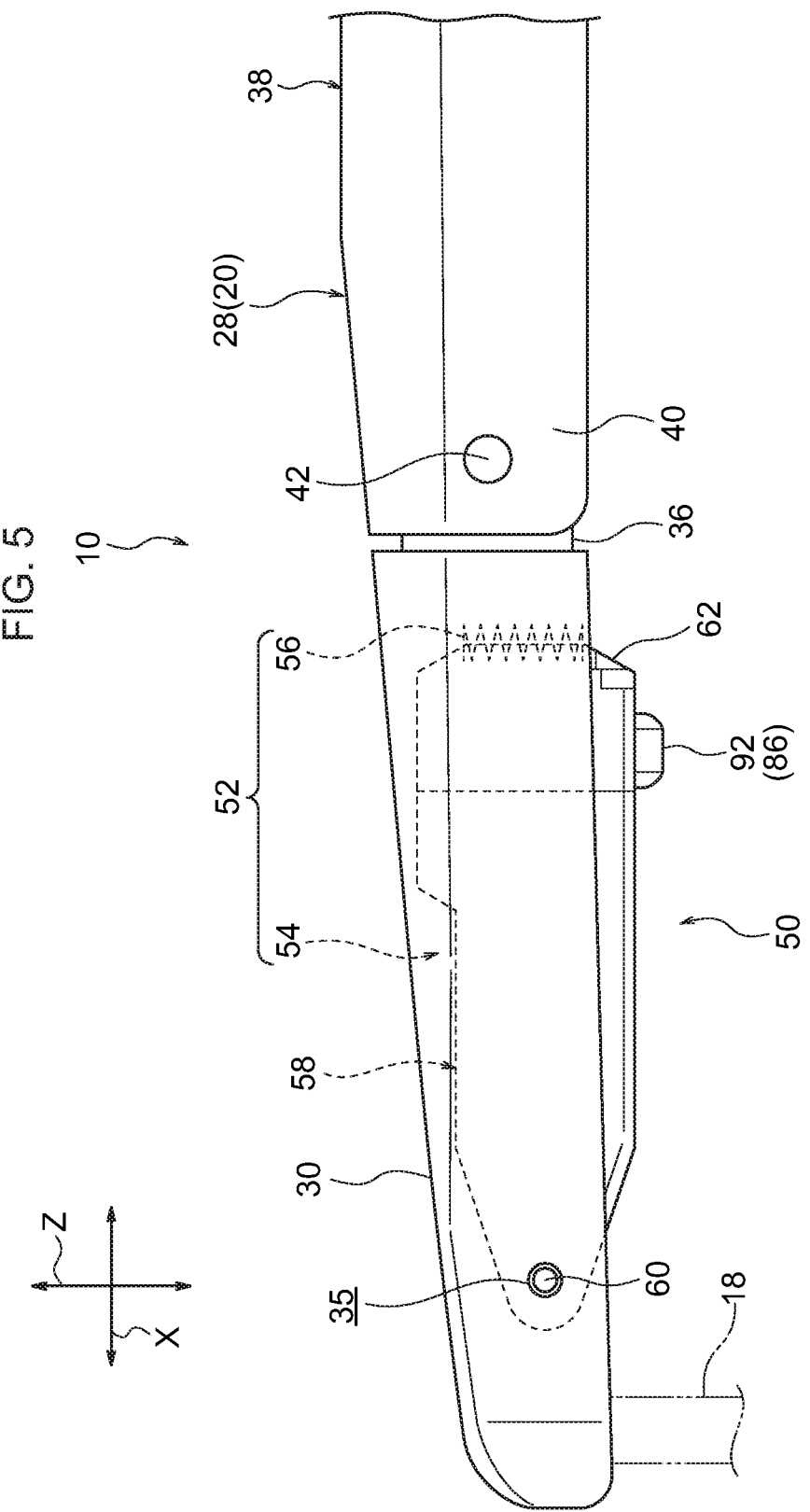
FIG. 5 is a side view illustrating partial configuration of a wiper device according to the first exemplary embodiment.
Figure 6:
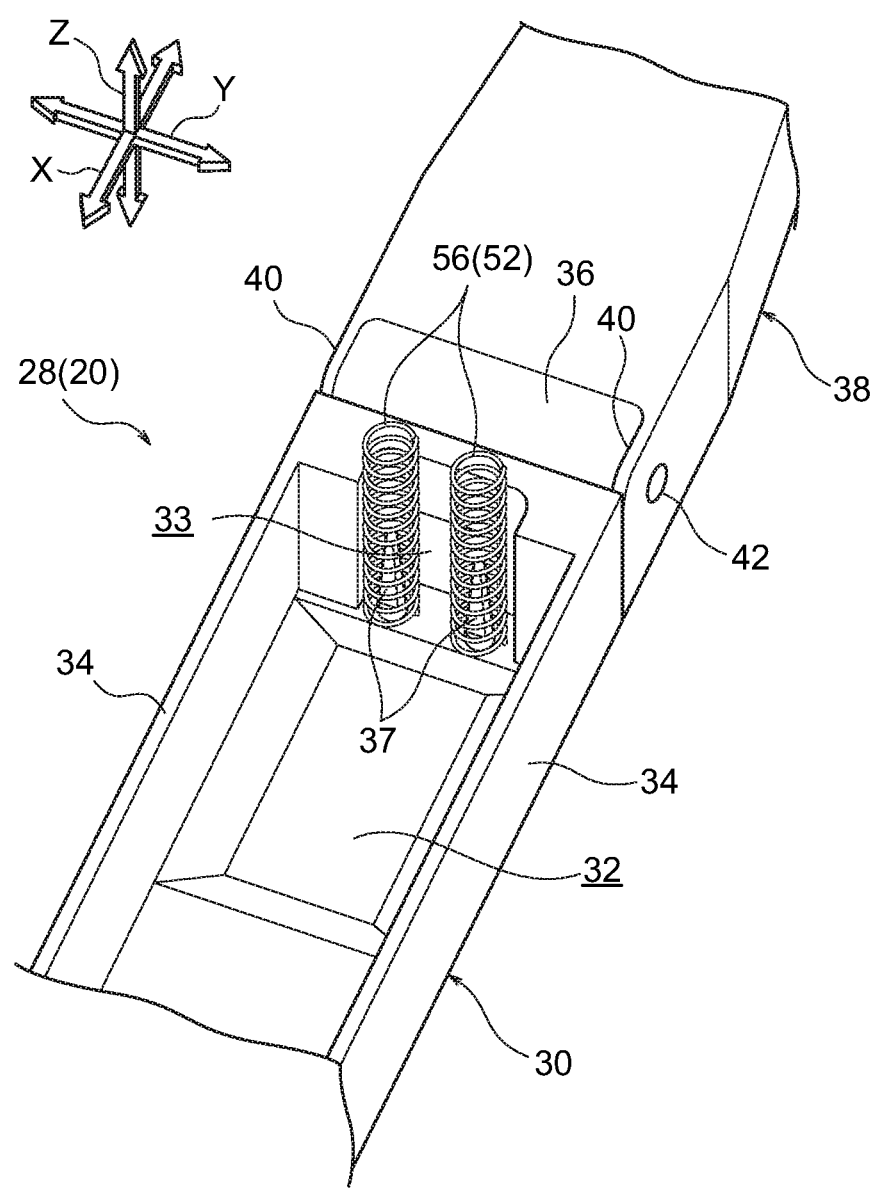
FIG. 6 is a perspective view illustrating a state in which a drive unit has been detached from an arm head.
Figure 7:
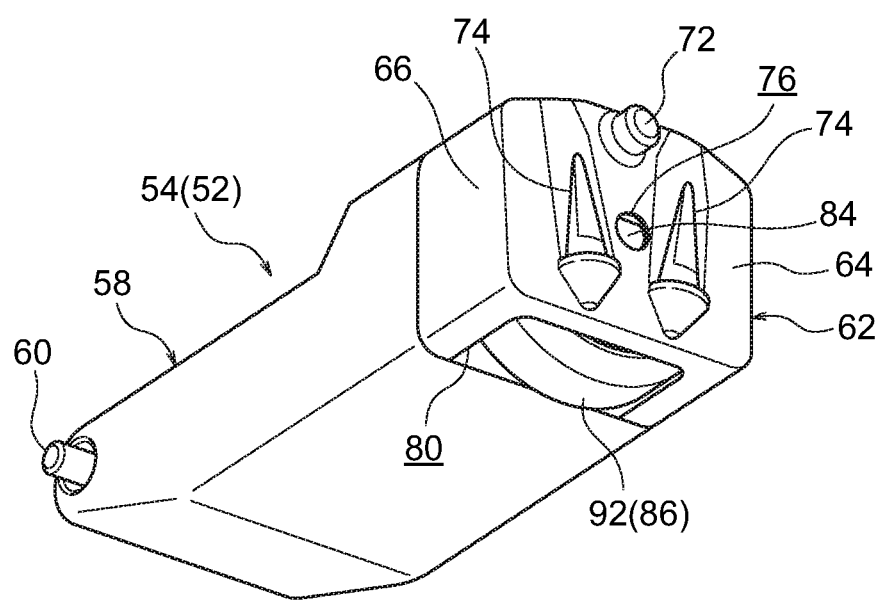
FIG. 7 is a perspective view illustrating a drive unit.
Figure 8:
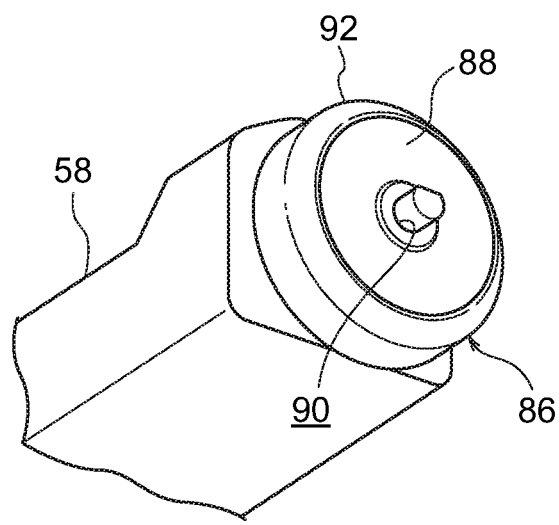
FIG. 8 is a perspective view illustrating a state in which a drive wheel cover has been detached from a case of a drive unit.
Figure 9:
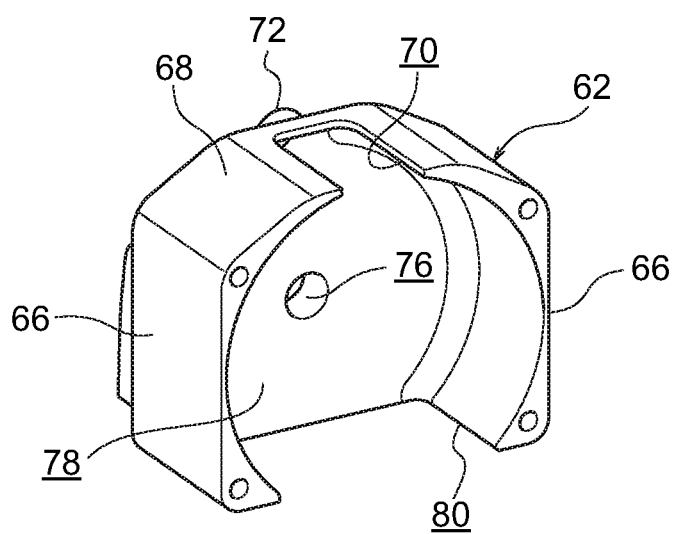
FIG. 9 is a perspective view illustrating a drive wheel cover.
Figure 10:
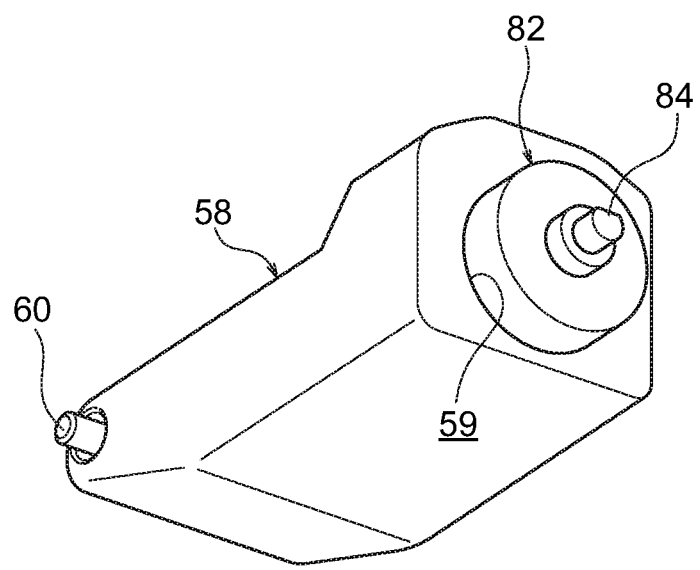
FIG. 10 is a perspective view illustrating a state in which a drive wheel has been detached from a motor of a drive unit.
Figure 11:
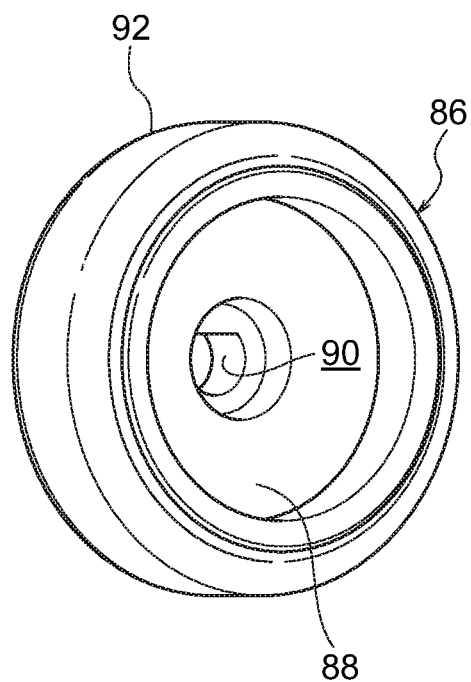
FIG. 11 is a perspective view illustrating a drive wheel.

Explanation follows regarding a wiper device 10 according to a first exemplary embodiment of the present disclosure, with reference to FIG. 1 to FIG. 11. Note that in the drawings, some reference numerals may be omitted in the interests of simplicity. Dimensions in the drawings have been altered as appropriate for ease of explanation.

Configuration

As illustrated in FIG. 1 to FIG. 5, the wiper device 10 according to the first exemplary embodiment of the present disclosure is a vehicle wiper device for wiping raindrops and the like that have adhered to a wiping surface 14 configured by an outer surface of a windshield 12 (not illustrated in the drawings, with the exception of FIG. 1) of a vehicle such as an automobile. The wiper device 10 is configured by a self-driven wiper including a wiper member 20 and a drive unit 50 supported by (installed to) the wiper member 20. The wiper member 20 is configured by a wiper arm 28 that pivots back and forth (swings back and forth) about a support shaft 18, serving as a support section provided at the vehicle, and a wiper blade 22 that is coupled to a leading end portion of the wiper arm 28 and that wipes the wiping surface 14. The drive unit 50 is configured by a suspension device 52, a motor 82 configured by an electric motor, and a drive wheel 86.

Note that it is sufficient that the wiper member 20 of the present exemplary embodiment include at least the wiper arm 28 out of the wiper blade 22 and the wiper arm 28. Namely, the wiper member 20 and the wiper blade 22 may be considered as separate configuration elements. In other words, the present exemplary embodiment may be considered as an exemplary embodiment disclosing the wiper arm 28 that is installed with the drive wheel 86 and the motor 82 (drive source). Moreover, although the windshield 12 is configured by a front windshield, there is no limitation thereto, and the windshield 12 may be a rear windshield.

The wiper blade 22 is what is referred to as a flat wiper blade, and includes a blade rubber 24 that is, for example, formed from rubber in an elongated shape, a rubber holder 26 to which the blade rubber 24 is attached, and a non-illustrated backing housed within the rubber holder 26 so as to urge both length direction end sides of the blade rubber 24 toward the windshield 12. The rubber holder 26 is, for example, formed in an elongated shape from a soft resin material, and the backing is, for example, formed in an elongated shape from a metal material such as spring steel. Note that the wiper blade of the present disclosure may be configured with a tournament structure in which plural levers are coupled together in a tournament pattern.

The wiper arm 28 is supported by the support shaft 18 provided at a front cowl section 17 (not illustrated in the drawings, with the exception of in FIG. 1) of the vehicle, and includes an arm head 30 capable of pivoting about the support shaft 18 relative to the vehicle, and a retainer 38 coupled to the arm head 30 so as to be capable of pivoting about a hinge shaft 42. The wiper arm 28 is formed in an elongated shape overall. The arm head 30 and the retainer 38 are each formed from a metal material or a resin material (a resin material in this example), or from a resin material in which a metal material is embedded. Note that in the drawings, the arrows X, Y, and Z respectively indicate a length direction, a width direction, and a pivot axis direction of the wiper arm 28.

The arm head 30 configures a base end side location of the wiper arm 28, and is formed in an elongated box shape with its length running along the length direction X of the wiper arm 28. The arm head 30 is open toward a vehicle body (toward the windshield 12). The support shaft 18 is fixed to a length direction one end portion of the arm head 30 that configures a base end portion of the wiper arm 28. The support shaft 18 is disposed with its axial direction in a direction orthogonal to both the length direction X and the width direction Y of the wiper arm 28, namely along the pivot axis direction Z of the wiper arm 28. The support shaft 18 projects from the front cowl section 17 of the vehicle toward the upper side, and is rotatably supported by a non-illustrated shaft bearing provided within the front cowl section 17. Note that configuration may be made in which a shaft bearing is attached to a base end portion of the arm head 30, and the support shaft 18 is fixed to the vehicle body so to be incapable of rotating.

A drive unit housing chamber 32 is formed at a length direction intermediate portion of the arm head 30 so as to open toward the windshield 12. The drive unit housing chamber 32 accommodates the drive unit 50, described later, and has an elongated rectangular shape with its length running in the length direction X of the wiper arm 28 as viewed along the pivot axis direction Z of the wiper arm 28, namely as viewed along the axial direction of the support shaft 18. The arm head 30 includes a pair of sidewalls 34 opposing each other across the drive unit housing chamber 32 in the width direction Y of the wiper arm 28. A coupling portion 36 to which the retainer 38 is coupled is provided at a length direction other end portion of the arm head 30.

The retainer 38 configures leading end side and intermediate locations of the wiper arm 28, and has an elongated shape with its length running along the length direction X of the wiper arm 28. A length direction one end portion of the retainer 38 is provided with a pair of coupling plates 40 opposing each other in the width direction Y of the wiper arm 28. The coupling portion 36 of the arm head 30 is fitted between the pair of coupling plates 40. The hinge shaft 42 passes through the pair of coupling plates 40 and the coupling portion 36 with its axial direction running along the width direction Y of the wiper arm 28. Axial direction displacement of the hinge shaft 42 with respect to the pair of coupling plates 40 and the coupling portion 36 is restricted, and the retainer 38 is coupled to the arm head 30 so as to be capable of pivoting about the hinge shaft 42 (about an axis running in the width direction Y of the wiper arm 28).

A non-illustrated tension spring spans between the arm head 30 and the retainer 38. The tension spring is configured by, for example, a tension coil spring, and urges the retainer 38 in one direction about the hinge shaft 42, namely in a direction to pivot a length direction other end portion of the retainer 38 toward the windshield 12.

The length direction other end portion of the retainer 38 (an end portion on the opposite side of the retainer 38 to the arm head 30) configures a leading end portion of the wiper arm 28. A length direction intermediate portion of the wiper blade 22 is coupled to the length direction other end portion of the retainer 38. The blade rubber 24 of the wiper blade 22 is thus pressed against the windshield 12 by the urging force of the tension spring.

As illustrated in FIG. 2 to FIG. 5 and FIG. 7 to FIG. 11, the drive unit 50 is configured by the suspension device 52, the motor 82, and the drive wheel 86. The drive unit 50 is attached to the arm head 30 in a state in which the majority of the drive unit 50 is housed in the drive unit housing chamber 32 in the arm head 30.

The suspension device 52 is configured by a case 54 attached to the arm head 30 so as to be capable of pivoting, and a pair of compression coil springs (see FIG. 5 and FIG. 6) installed between the arm head 30 and the case 54. The case 54 is configured by a case body 58 formed in an elongated substantially rectangular block shape, and a drive wheel cover 62 attached to a length direction one end portion of the case body 58. The case body 58 and the drive wheel cover 62 are, for example, configured from a resin material.

The case body 58 is inserted into the drive unit housing chamber 32 so as to be oriented with its length direction running along the length direction X of the wiper arm 28. At a length direction other end portion of the case body 58, positioned on the base end portion side (support shaft 18 side) of the wiper arm 28, a pair of circular columnar shaped shafts 60 are formed projecting toward both sides in the width direction Y of the wiper arm 28. The shafts 60 fit together rotatably with a pair of shaft bearing holes 35 (see FIG. 5) formed in the two sidewalls 34 of the arm head 30. The pair of shafts 60 and the pair of shaft bearing holes 35 are disposed coaxially to each other, with axial directions of each running in the width direction Y of the wiper arm 28. The case body 58 is coupled to the arm head 30 so as to be capable of pivoting about an axis running in the width direction Y.

The drive wheel cover 62 attached to the length direction one end portion of the case body 58 has a substantially box shape opening toward the case body 58 and toward the windshield 12, and is fixed to the case body 58 by screws, clips, press-fitting, or the like. The drive wheel cover 62 is an integral unit including a front wall 64 opposing the case body 58 from the wiper arm 28 leading end portion side, a pair of sidewalls 66 opposing each other in the width direction Y of the wiper arm 28, and an upper wall 68 linking together end portions of the pair of sidewalls 66 and the front wall 64 on the opposite side to the wiping surface 14. A width direction Y central portion of the upper wall 68 is formed with a notch 70 notched from the case body 58 side.

A drive wheel housing chamber 78 to house the drive wheel 86 is formed between the pair of sidewalls 66 and between the front wall 64 and the case body 58. The drive wheel housing chamber 78 has a substantially circular shape as viewed along the length direction X of the wiper arm 28. The drive wheel housing chamber 78 is open toward the windshield 12 through an opening 80 formed in an end portion on the windshield 12 side of the drive wheel cover 62 (an end portion on the opposite side to the upper wall 68).

A circular columnar shaped protrusion 72 is formed to an end face of the front wall 64 of the drive wheel cover 62 on the opposite side to the case body 58. The protrusion 72 projects toward the opposite side to the case body 58 (toward the retainer 38 side). The protrusion 72 is disposed in (inserted into) a recess 33 formed in an inner face of the drive unit housing chamber 32 on the length direction other end portion side of the arm head 30. The recess 33 is set with a larger dimension in the pivot axis direction Z of the wiper arm 28 than a dimension of the protrusion 72 in the pivot axis direction Z. The protrusion 72 and the recess 33 limit a pivot range of the case 54 with respect to the arm head 30 to within a fixed range.

An end face of the front wall 64 of the drive wheel cover 62 on the opposite side to the case body 58 is formed with a pair of substantially circular conical shaped projections 74 projecting toward the opposite side to the wiping surface 14. The projections 74 are disposed in line with each other along the width direction Y of the wiper arm 28. The projections 74 form respective pairs with a pair of projections 37 (see FIG. 6) formed on an upper face of the drive unit housing chamber 32. The pair of projections 37 have substantially circular conical shapes and project toward the windshield 12. The pair of projections 74 and the pair of projections 37 are inserted inside a pair of compression coil springs 56 (see FIG. 5 and FIG. 6) from opposite sides to each other. The pair of compression coil springs 56 are thus prevented from falling out of the arm head 30 and the case 54. The case 54 is urged toward the windshield 12 by the compression coil springs 56.

The case body 58 of the case 54 is formed with a motor housing chamber 59 (see FIG. 10) opening toward the length direction other end portion of the arm head 30 (toward the leading end portion of the wiper arm 28). The motor 82 is inserted into and supported by (gently press-fitted into) the motor housing chamber 59. The motor housing chamber 59 and the motor 82 are both formed in circular columnar shapes in this example. The motor 82 is fixed to the case body 58 such that the axial direction of a non-illustrated armature of the motor 82 is oriented running along the length direction of the case body 58. One axial direction end portion of the motor 82 projects to the outside of the case body 58. An output shaft 84 of the motor 82 is provided to this projecting portion. The output shaft 84 is integrally formed to an armature shaft, and is disposed with its axial direction running along the length direction X of the wiper arm 28. The output shaft 84 projects toward the leading end side of the wiper arm 28 (toward the retainer 38), and has what is referred to as a D-cut profile as viewed along the length direction X of the wiper arm 28. The drive wheel 86 is attached to the output shaft 84.

The drive wheel 86 is rotatably supported by the wiper arm 28 at a position of the wiper arm 28 at a separation from the support shaft 18 (in the present exemplary embodiment, further toward the leading end side of the wiper arm 28 than the support shaft 18). The drive wheel 86 rolls across a running face 16 (see FIG. 1) provided at the windshield 12 of the vehicle so as to displace (pivot) the wiper member 20 (the wiper arm 28 and the wiper blade 22) relative to the vehicle. Namely, in the present exemplary embodiment, the friction-driven wiper member 20 that supports the drive wheel 86 and the motor 82 is configured to run by itself utilizing frictional force between the drive wheel 86 and the windshield 12 when the drive wheel 86 rolls as described above.

The drive wheel 86 is configured by a wheel portion 88 formed in a circular tube shape with a short axial direction dimension and a bottom, and a tire portion 92 formed in a circular tube shape (ring shape) with a short axial dimension and mounted to an outer peripheral portion of the wheel portion 88. The drive wheel 86 is disposed such that the length direction X of the wiper arm 28 (wiper member 20) corresponds to a rotation axial direction of the drive wheel 86. The wheel portion 88 is, for example, formed from a resin material, and the one axial direction end portion of the motor 82 is inserted inside the wheel portion 88 without contacting the wheel portion 88. A central portion of a bottom wall of the wheel portion 88 is formed with a shaft fixing hole 90 with what is referred to as a D-cut profile as viewed along the axial direction of the wheel portion 88, and the output shaft 84 is press-fitted into the shaft fixing hole 90. The wheel portion 88 is thus fixed to the output shaft 84 so as to be capable of rotating as a unit therewith. A leading end portion of the output shaft 84 is inserted into a circular through hole 76 formed in the front wall 64 of the drive wheel cover 62.

The tire portion 92 is formed in a circular tube shape (ring shape) from a rubber-like material (rubber in this example). The wheel portion 88 is fitted inside the tire portion 92 such that the tire portion 92 rotates as a unit with the wheel portion 88. Note that the material of the tire portion 92 is not limited to rubber, and may be a resin with similar properties (elasticity and coefficient of friction) to rubber.

The drive wheel 86 is supported by the arm head 30 of the wiper arm 28 (wiper member 20) through the motor 82 and the suspension device 52. The motor 82 and the suspension device 52 are supported by the arm head 30 such that the motor 82 and the suspension device 52 undergo displacement (pivot) together with the wiper member 20. The tire portion 92 of the drive wheel 86 is disposed so as to partially project to the outside of the case 54 (toward the windshield 12) through the opening 80 in the drive wheel cover 62, such that part of an outer peripheral face of the tire portion 92 contacts the windshield 12. This part of the outer peripheral face of the tire portion 92 is pressed against the windshield 12 by the urging force of the pair of compression coil springs 56 of the suspension device 52.

The drive wheel 86 is rotation driven by the motor 82 so as to roll across the running face 16 (see FIG. 1) set on an outer surface of the windshield 12. The wiper member 20 configured by the wiper arm 28 and the wiper blade 22 is thus configured to pivot about the support shaft 18. Namely, since the displacement of the wiper member 20 caused by the rolling of the drive wheel 86 is limited such that the wiper member 20 pivots about the support shaft 18, the running face 16 that the drive wheel 86 supported by the wiper member 20 rolls across curves in a circular arc shape concentric to the support shaft 18. When the drive wheel 86 is rolling (when the wiper member 20 is pivoting), the suspension device 52 elastically displaces the drive wheel 86 and the motor 82 relative to the arm head 30 in response to a reaction force received from the running face 16 by the drive wheel 86. The drive wheel 86 is thus configured to make consistent close contact with the running face 16.

A control section 94 (not illustrated in the drawings, with the exception of in FIG. 3) is electrically connected to the motor 82. The control section 94 includes a central processing unit (CPU) 94A, read only memory (ROM) 94B, random access memory (RAM) 94C, and an input/output interface (I/O) 94D for communication with external devices. The CPU 94A, the ROM 94B, the RAM 94C, and the I/O 94D are connected to one another through a bus 94E. The CPU 94A reads a program from the ROM 94B and executes the program using the RAM 94C as a workspace. Note that the control section may be configured from plural electronic control units, and may be implemented using both hardware and software.

A position-finding sensor 96 (not illustrated in the drawings, with the exception of in FIG. 3) that detects the position of the wiper arm 28 relative to the vehicle is electrically connected to the I/O 94D of the control section 94. The position-finding sensor 96 is, for example, configured by an angle sensor that detects a rotation position (rotation angle) of the support shaft 18 with respect to the vehicle. The control section 94 is configured to detect the rotation position of the wiper arm 28 relative to the vehicle based on output from the position-finding sensor 96, and to control actuation of the motor 82 based on this detection result so as to rotate the output shaft 84 of the motor 82 forward or in reverse. The drive wheel 86 fixed to the output shaft 84 is thus rotated back and forth so as to roll across the running face 16. As a result, the wiper member 20 is configured to pivot back and forth between one end return position, this being one end of a pivot range of the wiper member 20, and another end return position, this being the other end of the pivot range of the wiper member 20. The control section 94 also controls actuation of the motor 82 based on the detection result of the position-finding sensor 96 in order to correct positional misalignment of the wiper member 20 resulting from the drive wheel 86 slipping against the running face 16.

Operation and Advantageous Effects

Explanation follows regarding operation and advantageous effects of the present exemplary embodiment.

In the wiper device 10 according to the present exemplary embodiment, the wiper member 20 including the wiper blade 22 and the wiper arm 28 is supported by the support shaft 18 provided at the vehicle at the base end portion of the wiper arm 28 so as to enable the wiper member 20 to undergo displacement relative to the vehicle. The drive wheel 86 and the motor 82 are supported by the wiper member 20. The drive wheel 86 is rotation driven by the motor 82 so as to roll across the running face 16 provided at the vehicle. The wiper member 20 is thus displaced relative to the vehicle so as to wipe the wiping surface 14 of the windshield 12. Moreover, since the drive wheel 86 and the motor 82 are supported by the wiper member 20 at a position at a separation from the support shaft 18, there is no need to install a motor or the like in the vehicle (for example within the front cowl section 17). This enables constraints on installation to be greatly reduced.

In the present exemplary embodiment, the base end portion of the wiper member 20 is supported by the support shaft 18 provided at the vehicle, and the wiper member 20 is capable of pivoting about the support shaft 18. This enables the configuration of the support section to be reduced in size and also simplified in comparison to cases in which, for example, the wiper member 20 is supported so as to be capable of sliding relative to the vehicle. Moreover, since the drive wheel 86 is disposed at a position of the wiper member 20 at a separation from the support shaft 18, and more specifically at a position separated from the support section toward a side where load to drive the wiper blade 22 and the like is generated, the motor 82 can be set with a smaller torque than in configurations in which, for example, rotation of the support shaft 18 is directly driven by a motor. This enables a reduction in size and a reduction in power consumption of the motor 82.

Figure 12:
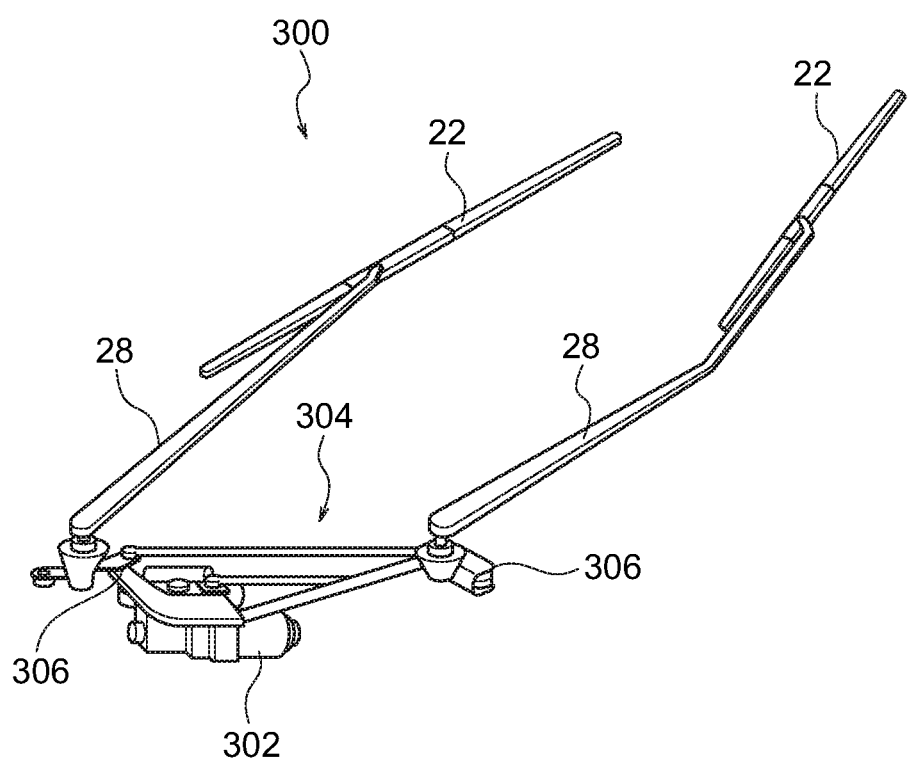
FIG. 12 is a perspective view illustrating a related link-type wiper device.
Figure 13:
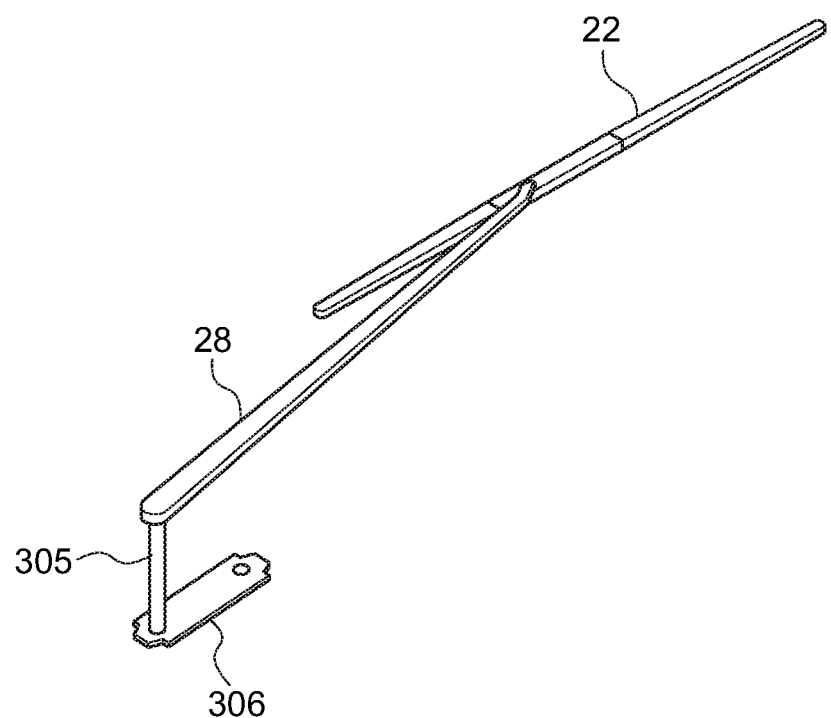
FIG. 13 is a perspective view illustrating partial configuration of the link-type wiper device illustrated in FIG. 12.
Figure 14:
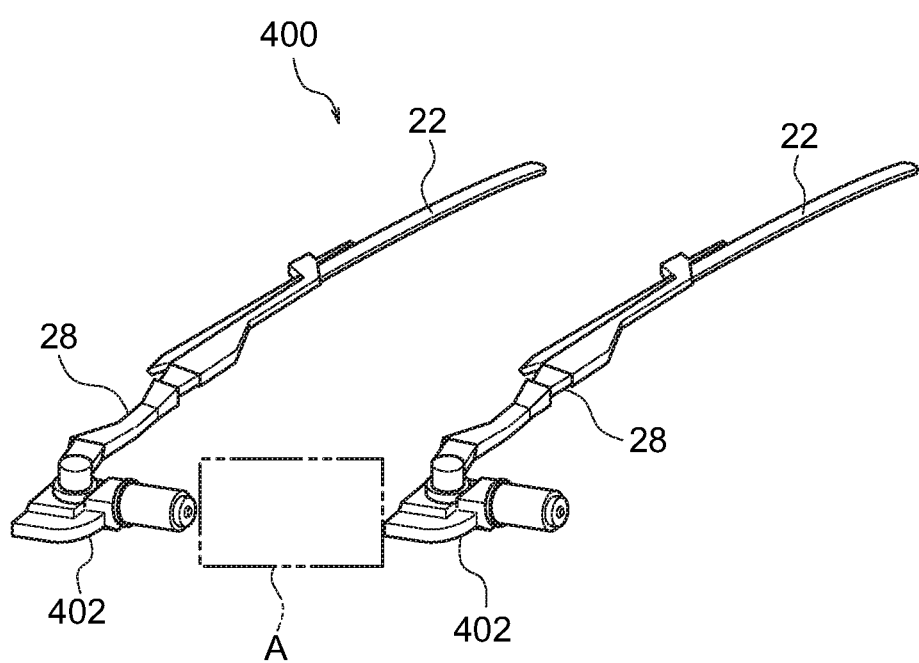
FIG. 14 is a perspective view illustrating a related direct-drive type wiper device.
Figure 15:
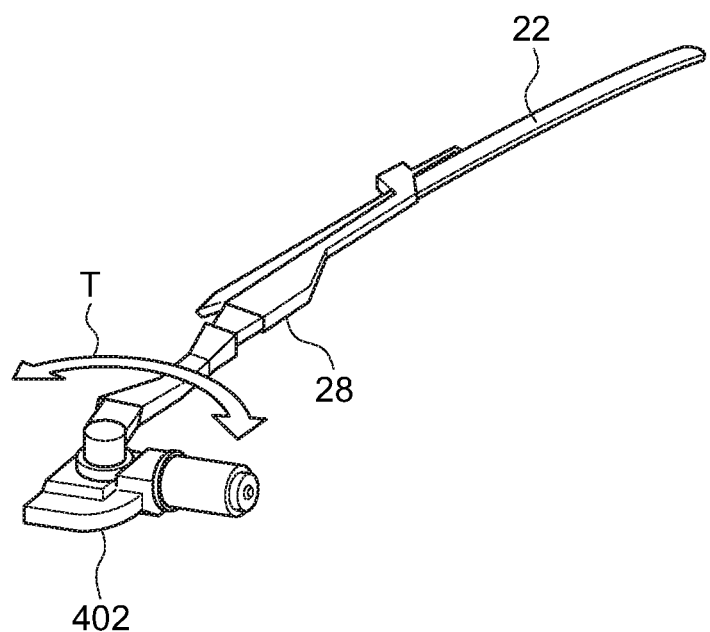
FIG. 15 is a perspective view illustrating partial configuration of the direct-drive type wiper device illustrated in FIG. 14.

Further explanation follows regarding the above advantageous effects, with reference to FIG. 12 to FIG. 15. FIG. 12 is a perspective view illustrating a related link-type wiper device 300. FIG. 13 is a perspective view illustrating partial configuration of the related link-type wiper device 300. FIG. 14 is a perspective view illustrating a related direct-drive type wiper device. FIG. 15 is a perspective view illustrating partial configuration of the direct-drive type wiper device. In each of FIG. 12 to FIG. 15, the reference numeral 28 indicates a wiper arm, and the reference numeral 22 indicates a wiper blade.

The link-type wiper device 300 illustrated in FIG. 12 and FIG. 13 includes a linkage 304 to convert rotation of a motor 302 into a back and forth swinging motion. The linkage 304 includes link levers 306 (see FIG. 13) and the like fixed to pivot shafts 305. Since torque is amplified according to the length of the link lever 306, the motor 302 can be set with a low drive torque. However, since the link-type wiper device 300 includes the linkage 304 that requires a large installation space, there is an issue in that severe constraints arise with regard to vehicle installation.

On the other hand, in the direct-drive type wiper device 400 illustrated in FIG. 14 and FIG. 15, the wiper arms 28 are directly attached to output shafts of respective motors 402, and the output shafts of the motors 402 are rotated forward and in reverse so as to pivot the wiper arms 28 and the wiper blades 22 back and forth. The two motors 402 are controlled synchronously. Since such a direct-drive type wiper device 400 does not require an installation space such as that for the linkage 304 described above (see the region A enclosed by double-dotted dashed lines in FIG. 14), installation in a front cowl of a vehicle or the like is facilitated. However, since there is no link mechanism to provide torque amplification, the drive torque demanded of the drive motors increases (see arrow T in FIG. 15), resulting in increased size of the drive motors. Accordingly, constraints may arise with regard to installation of the drive motors in the front cowl or the like of a vehicle. Moreover, issues also arise with regard to the increased weight and power consumption of the drive motors. In particular, a tandem configuration such as that illustrated in FIG. 14 entails a large increase in power consumption since two of the drive motors are required.

Regarding this point, in the wiper device 10 according to the present exemplary embodiment, since the drive wheel 86 and the motor 82 are installed to the wiper member 20 in the self-driven wiper device, constraints on installation such as those described above can be greatly reduced. Moreover, since the drive wheel 86 is disposed at a position of the wiper member 20 at a separation from the support shaft 18 toward the side where load to drive the wiper blade 22 and the like is generated, the motor 82 can be set with a smaller torque than in the direct-drive type wiper device 400 described above. This enables a reduction in size and reduction in power consumption of the motor 82 as a result.

Moreover, in the present exemplary embodiment, the drive wheel 86 supported by the wiper member 20 rolls across the running face 16 provided at the windshield 12 of the vehicle that is wiped by the wiper blade 22 of the wiper member 20. This enables a reduction in the number of components in comparison to cases in which the running face 16 is provided at a separate additional member.

Moreover, in the present exemplary embodiment, the rotation axial direction of the drive wheel 86 runs along the length direction of the wiper arm 28. This enables the drive wheel 86 to be made to roll across the running face 16 provided on the outer surface of the windshield 12 of the vehicle.

Moreover, in the present exemplary embodiment, the motor 82 is supported by the wiper member 20, which in turn is supported by the support shaft 18 provided at the vehicle, and the drive wheel 86 is supported by the motor 82. This enables a simpler configuration than in cases in which the motor 82 and the drive wheel 86 are each supported by the wiper member 20 separately.

Moreover, in the present exemplary embodiment, the drive wheel 86 is supported by the motor 82 that is in turn supported by the wiper member 20 through the suspension device 52. The suspension device 52 elastically displaces the drive wheel 86 and the motor 82 with respect to the wiper member 20 in response to the reaction force received by the drive wheel 86 from the running face 16 provided at the vehicle. This enables the drive wheel 86 rolling across the running face 16 to make consistent close contact with (follow) the running face 16.

In the present exemplary embodiment, the wiper arm 28 includes the arm head 30 supported by the support shaft, and the retainer 38 coupled to the arm head 30 so as to be capable of pivoting. The motor 82 is supported by the arm head 30, and the drive wheel 86 is supported by the motor 82. This enables pre-existing components to be employed for configurations of the wiper member 20 (such as the retainer 38) that are positioned away from the support shaft 18.

In the present exemplary embodiment, the drive wheel 86 is configured by the tire portion 92 including a portion made from a rubber-like material that contacts the running face 16 of the windshield 12. The drive wheel 86 can thus be prevented or suppressed from slipping against the running face 16. Moreover, for example, the rubber-like material may be modified as appropriate to modify the efficiency of drive force transmission from the drive wheel 86 to the running face 16, enabling adjustments to be made, for example to improve slip suppression. Moreover, due to the configuration described above, the drive wheel 86 that rolls across the running face 16 is capable of making consistent close contact with (following) the running face 16 as a result of the cushioning properties of the tire portion 92.

In the present exemplary embodiment, the position of the wiper member 20 relative to the vehicle is detected by the position-finding sensor 96, and the control section 94 controls actuation of the motor 82 based on the detection results of the position-finding sensor 96. This enables positional misalignment of the wiper member 20 due to the drive wheel 86 slipping against the running face 16 to be corrected.

Explanation follows regarding other exemplary embodiments of the present disclosure. Note that configurations and operation that are basically the same as those already explained in the foregoing exemplary embodiment are allocated the same reference numerals as in the foregoing exemplary embodiment, and explanation thereof is omitted.

Second Exemplary Embodiment

Figure 16:
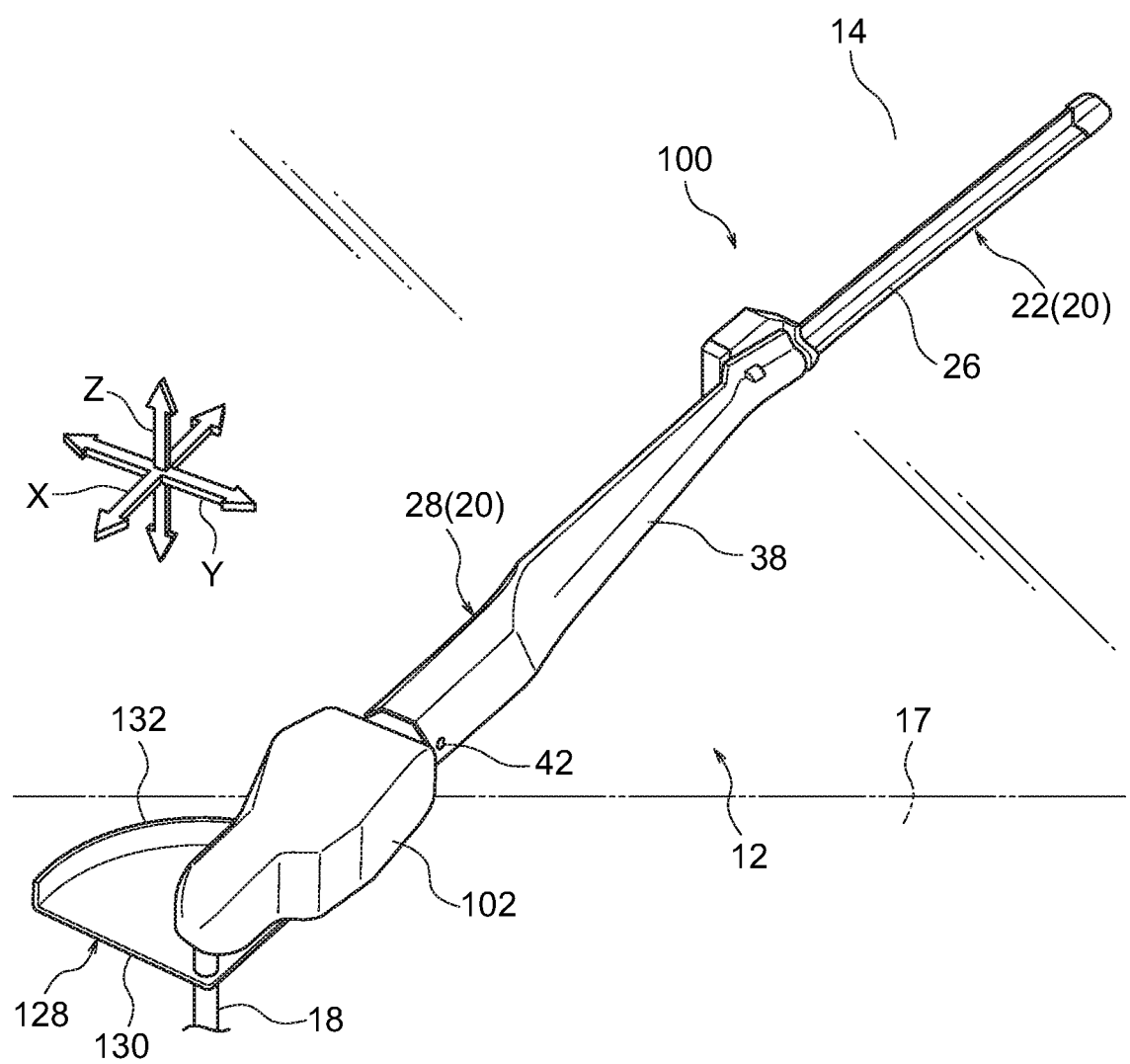
FIG. 16 is a perspective view illustrating a wiper device according to a second exemplary embodiment of the present disclosure.
Figure 17:
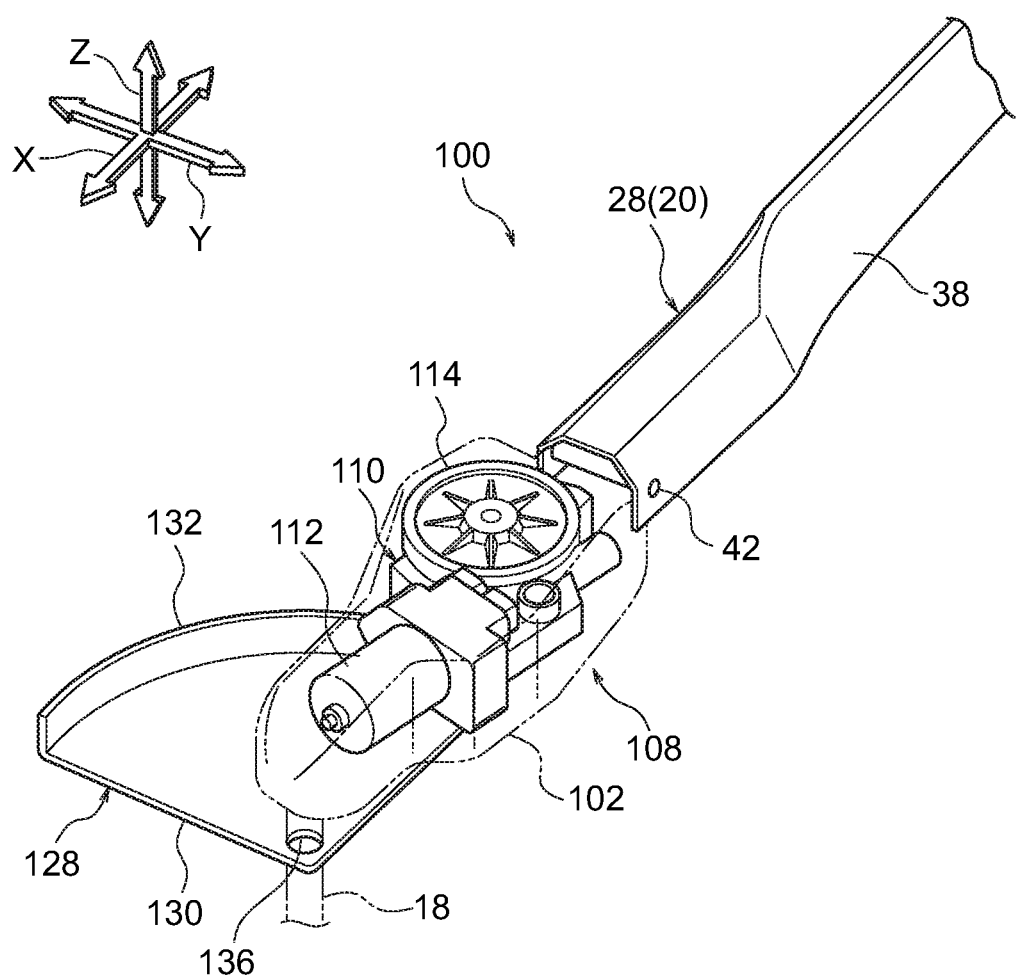
FIG. 17 is a perspective view illustrating a wiper device according to the second exemplary embodiment as viewed from a different angle to FIG. 16.
Figure 18:
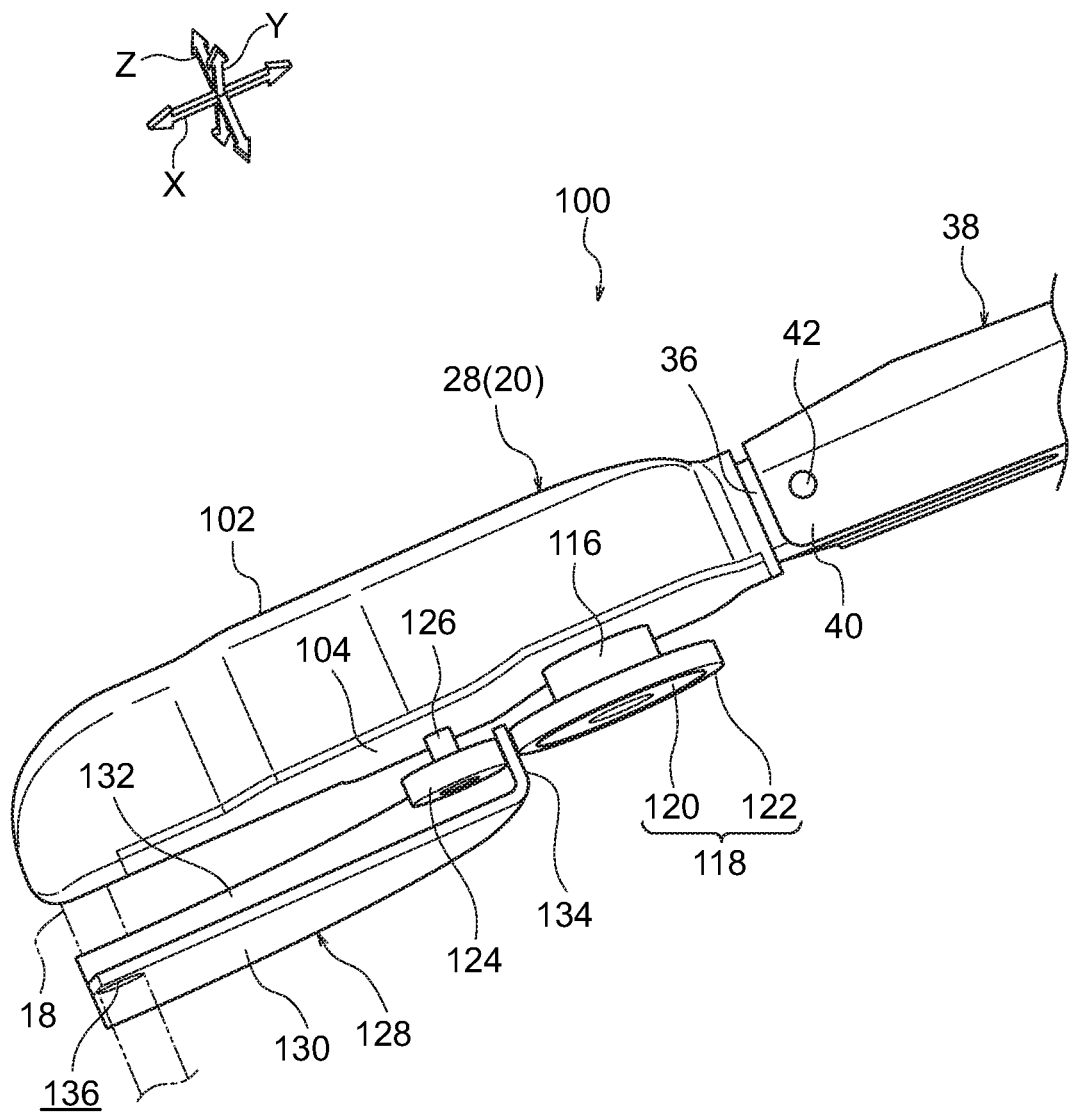
FIG. 18 is a perspective view illustrating part of the configuration illustrated in FIG. 16 as viewed from a different angle to FIG. 16.
Figure 19:
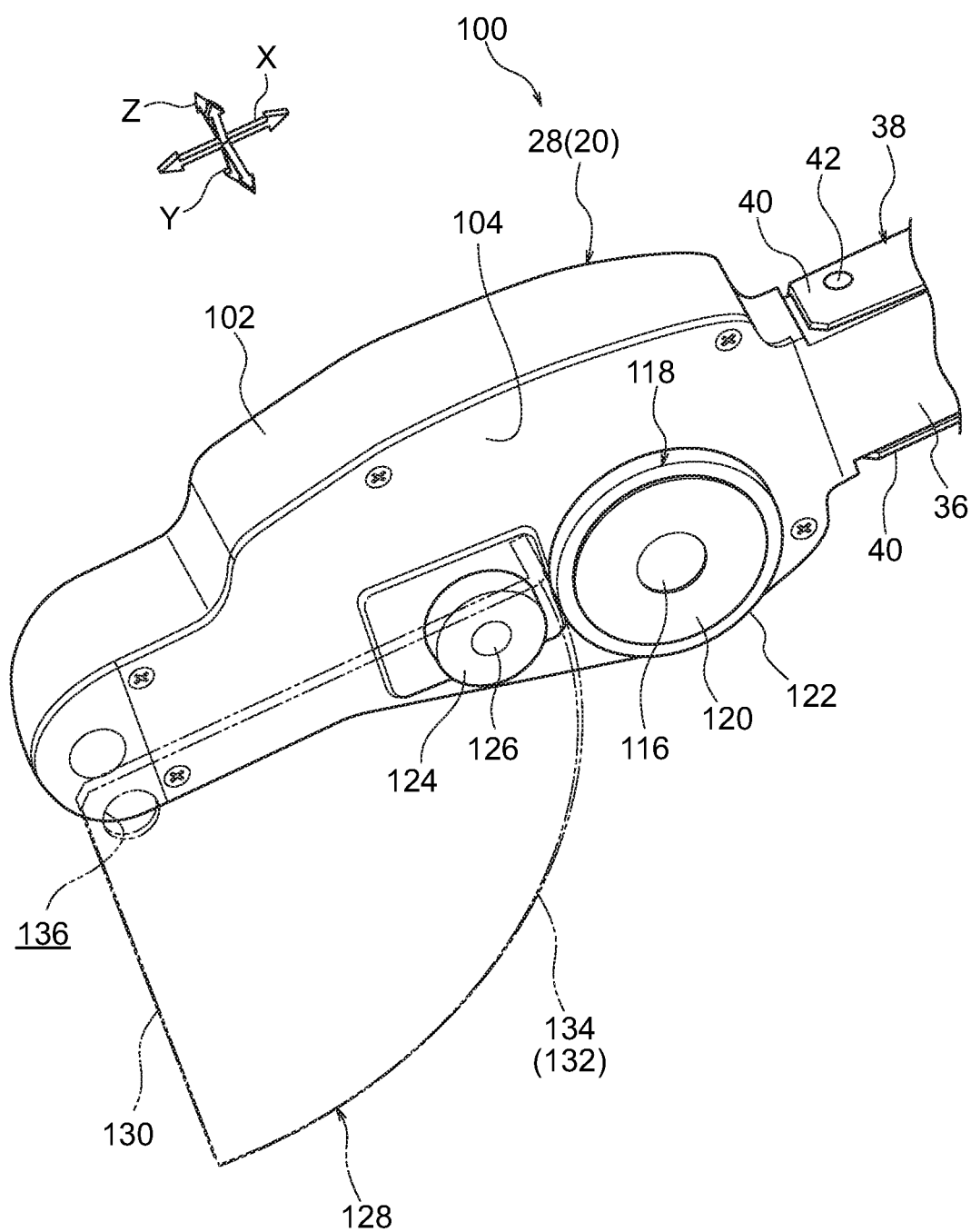
FIG. 19 is a perspective view illustrating part of the configuration illustrated in FIG. 18 as viewed from a different angle to FIG. 18.
Figure 20:
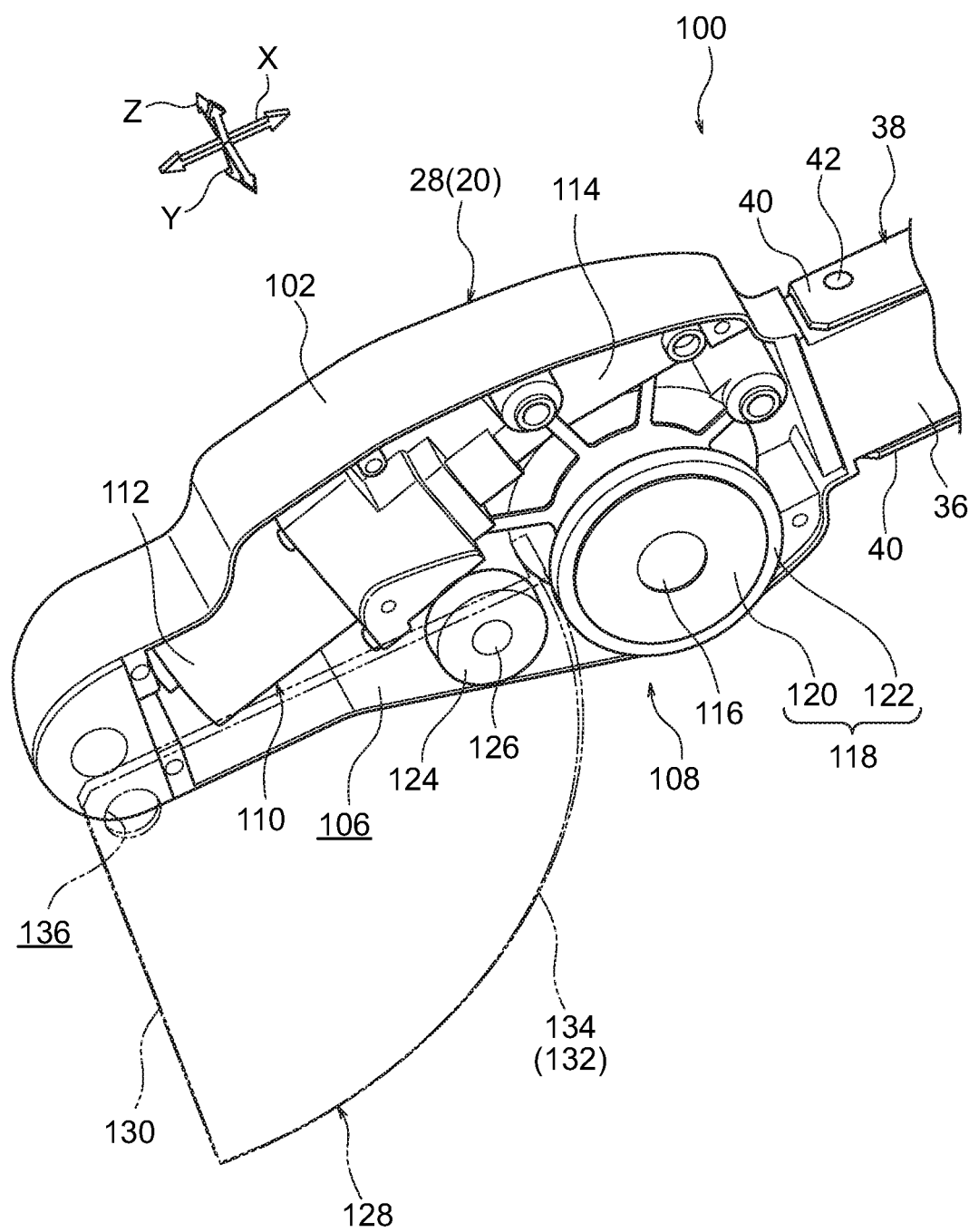
FIG. 20 is a perspective view illustrating a state in which a back face cover has been detached from an arm head in the configuration illustrated in FIG. 19.

FIG. 16 and FIG. 17 are perspective views illustrating a wiper device 100 according to a second exemplary embodiment of the present disclosure. FIG. 18 is a perspective view illustrating part of the configuration illustrated in FIG. 16 as viewed from a different angle to FIG. 16. FIG. 19 is a perspective view illustrating part of the configuration illustrated in FIG. 18 as viewed from a different angle to FIG. 18. FIG. 20 is a perspective view illustrating a state in which a back face cover 104 of an arm head 102 has been detached from the configuration illustrated in FIG. 19.

The wiper device 100 according to the second exemplary embodiment is a self-driven wiper similar to the wiper device 10 according to the first exemplary embodiment, and includes a wiper member 20 and a drive unit 108 (see FIG. 17 and FIG. 20). The drive unit 108 is configured by a reduction drive-fitted motor 110, this being a motor, a drive wheel 118, an auxiliary wheel 124, and a rail member 128. The wiper member 20 is configured similarly to the wiper member 20 according to the first exemplary embodiment, with the exception that the configuration of the arm head 102 differs from the configuration of the arm head 30 according to the first exemplary embodiment. Although the arm head 102 has the same basic configuration as the arm head 30, the arm head 102 is formed with a motor housing chamber 106 in which the reduction drive-fitted motor 110 is housed. The motor housing chamber 106 is open toward the vehicle body, and an opening thereof is closed off by the back face cover 104 (see FIG. 18 and FIG. 19). The back face cover 104 is plate shaped and is attached to the arm head 102.

The reduction drive-fitted motor 110 housed in the motor housing chamber 106 is configured by a motor body 112 and a reduction drive 114 to reduce the speed of rotation from the motor body 112. The reduction drive-fitted motor 110 is disposed further toward the leading end side of the wiper arm 28 than the support shaft 18. The motor body 112 is disposed such that an axial direction of a non-illustrated armature is oriented along the length direction X of the wiper arm 28, and the speed reducer 114 is disposed such that an axial direction of an output shaft 116 thereof is oriented along the pivot axis direction of the wiper arm 28. The reduction drive 114 is fixed to the arm head 102 using screws or the like.

A leading end portion of the output shaft 116 is inserted through a through hole (not allocated a reference numeral) formed in the back face cover 104 and projects to the lower side of the back face cover 104 (toward the vehicle body). The drive wheel 118 is attached to the leading end portion (lower end portion) of the output shaft 116 so as to be coaxial with the output shaft 116 and incapable of rotating relative thereto. Similarly to the drive wheel 86 according to the first exemplary embodiment, the drive wheel 118 is configured by a wheel portion 120 formed in a circular disc shape, and a tire portion 122 formed in a ring shape and mounted to an outer peripheral portion of the wheel portion 120. The wheel portion 120 is, for example, formed from a resin material, and is fixed to the leading end portion of the output shaft 116 so as to be coaxial with the output shaft 116 and incapable of rotating relative thereto. The tire portion 122 is formed from a rubber-like material, and the wheel portion 120 is fitted inside the tire portion 122. The tire portion 122 rotates as a unit with the wheel portion 120.

A rotation axial direction of the drive wheel 118 runs in a direction intersecting the length direction and the pivot direction (displacement direction) of the wiper member 20, namely runs in the pivot axis direction Z of the wiper arm 28. The drive wheel 118 is disposed at a position of the wiper arm 28 at a separation from the support shaft 18 (in the present exemplary embodiment, a position further toward the leading end side of the wiper arm 28 than the support shaft 18, namely a position at a separation from the support shaft 18 toward the side where load to drive the wiper blade 22 and the like is generated). The drive wheel 118 is rotatably supported by the wiper arm 28 through the reduction drive-fitted motor 110. The reduction drive-fitted motor 110 is supported by the arm head 102 so as to pivot (undergo displacement) together with the wiper member 20.

The auxiliary wheel 124 is disposed further toward a base end portion side (the support shaft 18 side) of the wiper member 20 than the drive wheel 118. The auxiliary wheel 124 is, for example, formed in a circular disc shape from a resin material, and is supported by the arm head 102 through a rotation shaft 126. The rotation shaft 126 is disposed with its axial direction running in the pivot axis direction Z of the wiper arm 28, and is rotatably supported by the arm head 102 or by housing of the reduction drive 114. A leading end portion of the rotation shaft 126 is inserted through a through hole (not allocated a reference numeral) formed in the back face cover 104 and projects to the lower side (vehicle body side) of the back face cover 104. The auxiliary wheel 124 is attached to a leading end portion (lower end portion) of the rotation shaft 126 so as to be coaxial with the rotation shaft 126 and incapable of rotating relative thereto. The auxiliary wheel 124 and the drive wheel 118 described above are disposed corresponding to the rail member 128.

The rail member 128 is, for example, formed by pressing a sheet metal material, is disposed at the vehicle body side (lower side) of the arm head 102, and is attached to the front cowl section 17 separately to the windshield 12. The rail member 128 is configured by a plate shaped member body 130 that has a spreading fan shape as viewed along the pivot axis direction Z of the wiper arm 28, and a circular arc shaped rail 132 projecting from a circular arc shaped edge of the member body 130 in one direction along the pivot axis direction Z. An end portion of the member body 130 on the opposite side to the rail 132 is formed with a circular through hole 136 through which the support shaft 18 is inserted. The rail member 128 is fixed to the front cowl section 17 by bolt fastening, welding, or the like.

The rail 132 of the rail member 128 is curved in a circular arc shape concentric to the support shaft 18, and is interposed between the drive wheel 118 and the auxiliary wheel 124. The drive wheel 118 contacts an outer peripheral face of the rail 132, and the auxiliary wheel 124 contacts an inner peripheral face of the rail 132. When the drive wheel 118 is rotated by the reduction drive-fitted motor 110, the drive wheel 118 accordingly rolls against the outer peripheral face of the rail 132 while the auxiliary wheel 124 rolls against the inner peripheral face of the rail 132, thereby causing the wiper member 20 to pivot about the support shaft 18. Namely, in the present exemplary embodiment, the outer peripheral face of the rail 132 configures a running face 134, and the rail 132 configuring the location formed with the running face 134 is interposed between the drive wheel 118 and the auxiliary wheel 124.

A control section 94 and a position-finding sensor 96 (not illustrated in FIG. 16 to FIG. 20) are electrically connected to the motor body 112 of the reduction drive-fitted motor 110. The control section 94 detects a rotation position of the wiper arm 28 relative to the vehicle based on the output of the position-finding sensor 96, and controls actuation of the motor body 112 based on this detection result in order to rotate the output shaft 116 of the reduction drive 114 forward or in reverse. The drive wheel 118 fixed to the output shaft 116 is thus rotated back and forth so as to roll across the running face 134. As a result, the wiper member 20 pivots back and forth between one end return position corresponding to one end of the pivot range of the wiper member 20, and another end return position corresponding to the other end of the pivot range of the wiper member 20. The pivot range of the wiper member 20 is the range over which the drive wheel 118 and the auxiliary wheel 124 remain in contact with the rail 132.

Other configurations of the present exemplary embodiment are similar to those of the first exemplary embodiment. Accordingly, the present exemplary embodiment is capable of obtaining the same basic operation and advantageous effects as the first exemplary embodiment, namely greatly reducing constraints on installation and enabling a reduction in size and reduction in power consumption of the reduction drive-fitted motor 110.

Moreover, in the present exemplary embodiment, the drive wheel 118 supported by the arm head 102 of the wiper arm 28 rolls across the running face 134 provided at the rail member 128. The rail member 128 is attached to the vehicle separately to the windshield 12 of the vehicle that is wiped by the wiper blade 22. Providing the running face 134 to the rail member 128 that is separate to the windshield 12 of the vehicle in this manner enables the degrees of freedom with regard to settings of the running face 134 to be increased.

Namely, as in the example of the present exemplary embodiment, the pivot axis direction of the drive wheel 118 can be aligned with the pivot axis direction Z of the wiper arm 28 (a direction intersecting with the length direction and the pivot direction of the wiper member 20). Since the direction of contact between the rail member 128 and the drive wheel 118 is a different direction to the direction in which the wiper arm 28 is pressed against the windshield 12, contact reaction force in the drive wheel 118 can be prevented from diminishing the pressing force of the wiper arm 28.

Moreover, for example, the support shaft 18 or the like may be utilized to configure a subassembly in which the rail member 128 is attached to the wiper member 20. Such a configuration makes positional precision of the running face 134 with respect to the drive wheel 118 easier to secure.

In the present exemplary embodiment, the location of the vehicle formed with the running face 134 (in this example, the rail 132 of the rail member 128) is interposed between the auxiliary wheel 124 that is rotatably supported by the wiper arm 28, and the drive wheel 118. This enables the drive wheel 118 to be pressed consistently against the running face 134, making slipping of the drive wheel 118 against the running face 134 easier to prevent.

Third Exemplary Embodiment

Figure 21:
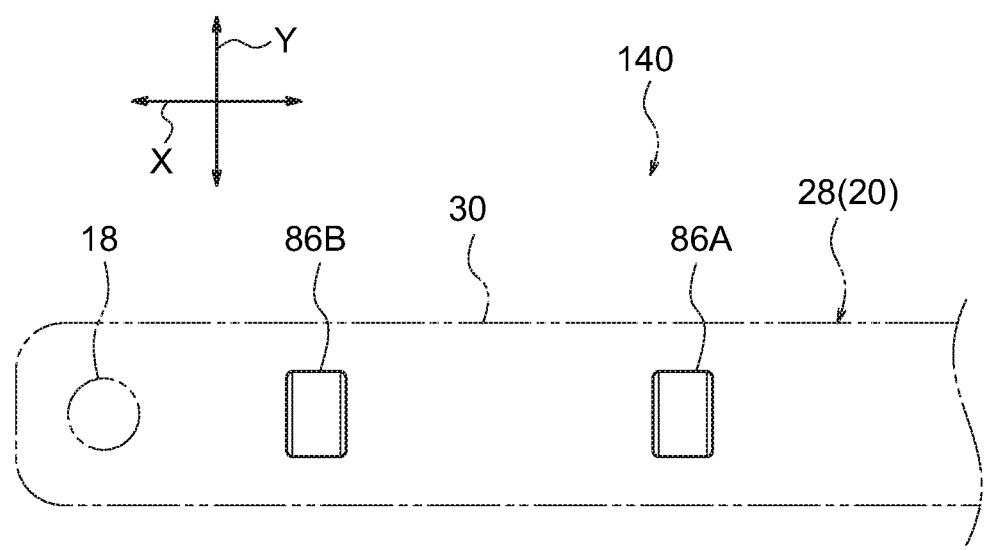
FIG. 21 is a schematic plan view illustrating partial configuration of a wiper device according to a third exemplary embodiment of the present disclosure.

FIG. 21 is a schematic plan view illustrating partial configuration of a wiper device 140 according to a third exemplary embodiment of the present disclosure. In the wiper device 140, a drive wheel 86A and a drive wheel 86B configure a pair of drive wheels supported by the arm head 30 of the wiper arm 28. The drive wheels 86A, 86B are disposed in line with each other along the length direction X of the wiper arm 28, and are separately rotation driven so as to roll across a pair of running faces provided at the windshield 12 (not illustrated in FIG. 21) by a pair of motors (not illustrated in FIG. 21) supported by the arm head 30. The rotation speed of the drive wheel 86A, which is disposed further than the drive wheel 86B from the support shaft 18, is set faster than the rotation speed of the drive wheel 86B. In the present exemplary embodiment, the difference in rotation speeds corresponds to the difference in the circumferential velocity of the wiper member 20 over circular arc shaped trajectories at different radii about the support shaft 18. This enables the wiper member 20 to be rotated smoothly yet firmly.

Fourth Exemplary Embodiment

Figure 22:
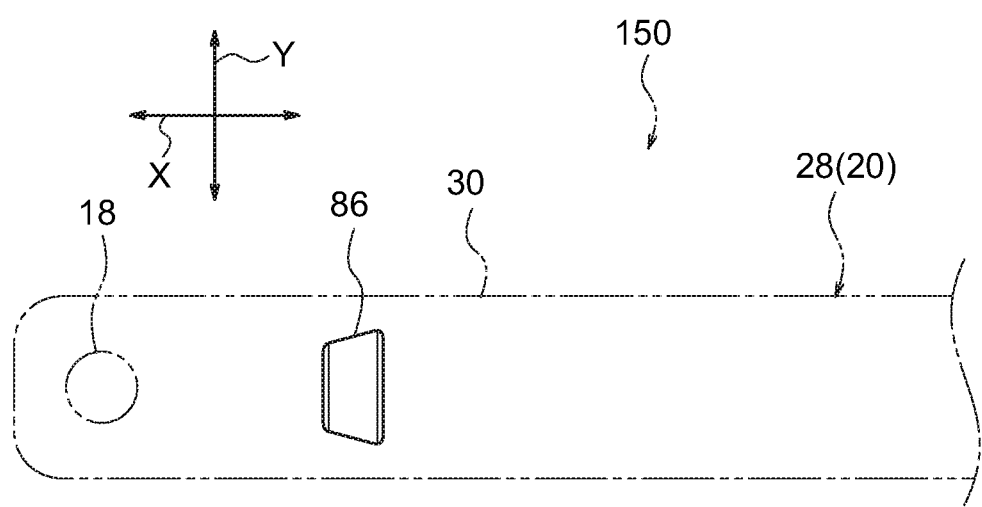
FIG. 22 is a schematic plan view illustrating partial configuration of a wiper device according to a fourth exemplary embodiment of the present disclosure.

FIG. 22 is a schematic plan view illustrating partial configuration of a wiper device 150 according to a fourth exemplary embodiment of the present disclosure. In the wiper device 150, the drive wheel 86 rotatably supported by the arm head 30 is formed in a truncated circular conical shape. The drive wheel 86 is disposed in an orientation such that an external diameter of the drive wheel 86 becomes larger on progression toward the leading end side of the wiper arm 28 (toward the opposite side to the support shaft 18). In the present exemplary embodiment, forming the drive wheel 86 in a truncated circular conical shape as described above enables drive loss to be reduced when the drive wheel 86 rolls (turns) in a circular arc shape about the support shaft 18 across a running face provided at the windshield 12.

Fifth Exemplary Embodiment

Figure 23:
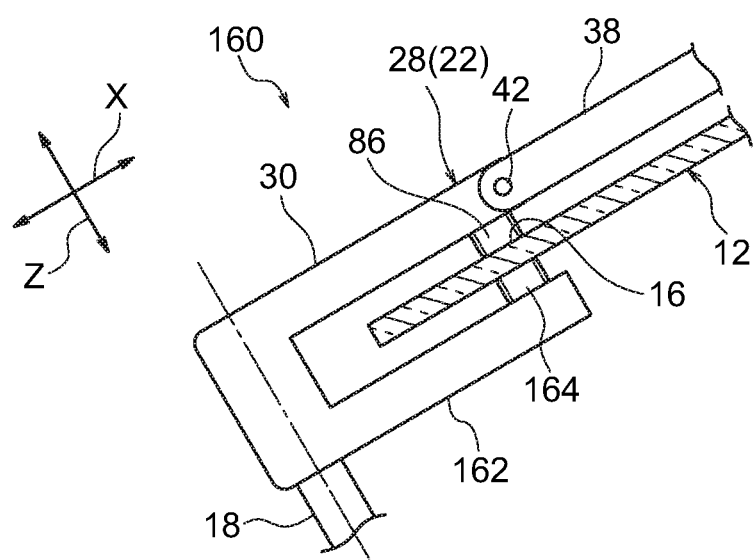
FIG. 23 is a partial cross-section schematically illustrating configuration in a region including part of a wiper device according to a fifth exemplary embodiment of the present disclosure.

FIG. 23 is a partial cross-section schematically illustrating configuration in a region including part of a wiper device 160 according to a fifth exemplary embodiment of the present disclosure. In the wiper device 160, the arm head 30 of the wiper arm 28 includes an inward extension portion 162 that extends toward an inner surface (vehicle inside) of the windshield 12. The inward extension portion 162 extends from the support shaft 18 side toward the leading end side of the wiper arm 28. The inward extension portion 162 rotatably supports an auxiliary wheel 164. The auxiliary wheel 164 is disposed with its axial direction running in the length direction X of the wiper arm 28, and the location of the windshield 12 formed with the running face 16 is interposed between the auxiliary wheel 164 and the drive wheel 86. In the present exemplary embodiment, not only does the auxiliary wheel 164 prevent contact reaction force in the drive wheel 86 from diminishing the pressing force of the wiper arm 28, but the auxiliary wheel 164 is also capable of pressing the drive wheel 86 against the running face 16, making slipping of the drive wheel 86 against the running face 16 easier to prevent.

Sixth Exemplary Embodiment

Figure 24:
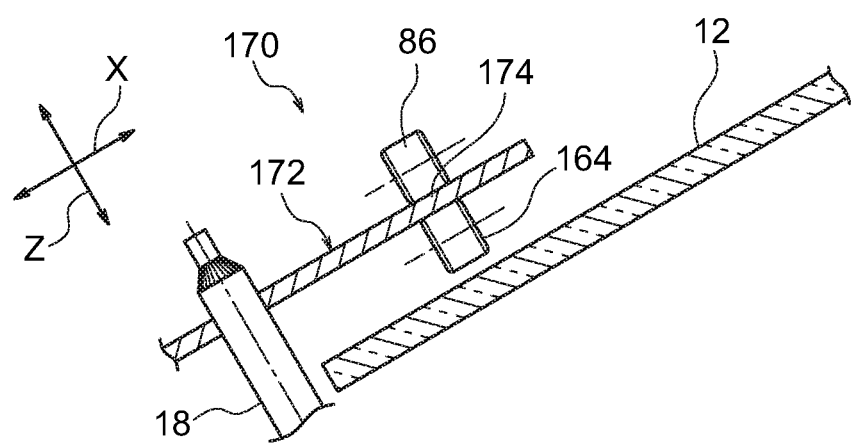
FIG. 24 is a partial cross-section schematically illustrating configuration in a region including part of a wiper device according to a sixth exemplary embodiment of the present disclosure.

FIG. 24 is a partial cross-section schematically illustrating configuration in a region including part of a wiper device 170 according to a sixth exemplary embodiment of the present disclosure. The wiper device 170 is configured similarly to the wiper device 160 of the fifth exemplary embodiment, except for that the wiper device 170 includes a plate shaped rail member 172 attached to the vehicle separately to the windshield 12. The drive wheel 86 rolls across a running face 174 provided at the rail member 172. A location of the rail member 172 formed with the running face 174 is interposed between the drive wheel 86 and the auxiliary wheel 164. Note that the arm head 30 is omitted from illustration in FIG. 24. The present exemplary embodiment is capable of obtaining similar advantageous effects to those of the fifth exemplary embodiment. Moreover, in the present exemplary embodiment, since the running face 174 is provided at the rail member 172 that is separate to the windshield 12 of the vehicle, the degrees of freedom with regard to settings of the running face 174 are also increased, similarly to in the second exemplary embodiment.

Seventh Exemplary Embodiment

Figure 25:
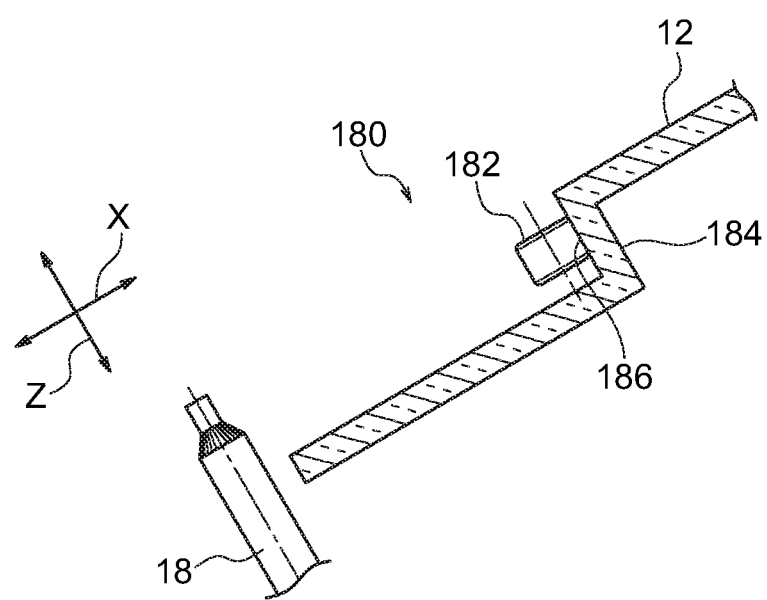
FIG. 25 is a partial cross-section schematically illustrating configuration in a region including part of a wiper device according to a seventh exemplary embodiment of the present disclosure.

FIG. 25 is a partial cross-section schematically illustrating configuration in a region including part of a wiper device 180 according to a seventh exemplary embodiment of the present disclosure. In the wiper device 180, a drive wheel 182 with a rotation axial direction running in the pivot axis direction Z of the wiper arm 28 is supported by the arm head 30 (not illustrated in FIG. 25) of the wiper arm 28. The windshield 12 is formed with a stepped portion 184 that has a crank shaped profile in cross-section. The stepped portion 184 has a circular arc shape concentric to the support shaft 18 as viewed along the pivot axis direction Z. A circular arc shaped end face of the stepped portion 184 configures a running face 186 which is contacted by an outer peripheral face of the drive wheel 182. The drive wheel 182 is rotation driven by a non-illustrated motor supported by the arm head 30 so as to roll across the running face 186. The present exemplary embodiment is capable of obtaining the same basic operation and advantageous effects as the first exemplary embodiment.

Eighth Exemplary Embodiment

Figure 26:
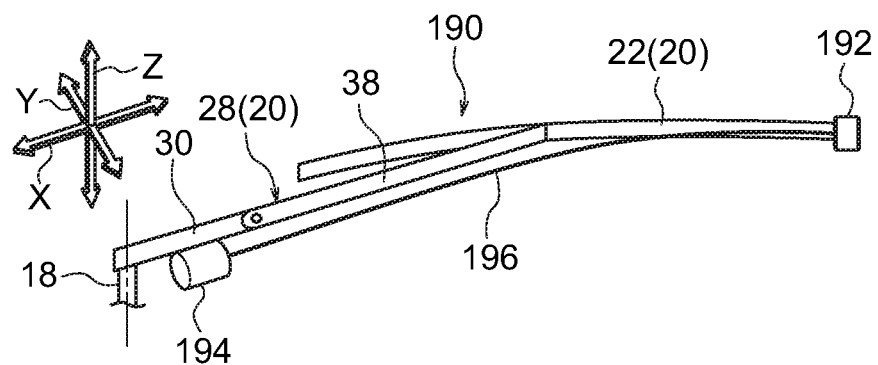
FIG. 26 is a schematic perspective view illustrating a wiper device according to an eighth exemplary embodiment of the present disclosure.

FIG. 26 is a schematic perspective view illustrating a wiper device 190 according to an eighth exemplary embodiment of the present disclosure. In the wiper device 190, a drive wheel 192 is rotatably supported by a leading end portion of the wiper member 20 (length direction one end portion of the wiper blade 22). A rotation axial direction of the drive wheel 192 runs in the length direction of the wiper member 20, and the drive wheel 192 is capable of rolling across a running face provided at the windshield 12 (not illustrated in FIG. 26). A flexible drive shaft 196 spans between the drive wheel 192 and an output shaft of a motor 194 supported by the arm head 30. The motor 194 is thus capable of driving rotation of the drive wheel 192. The present exemplary embodiment is also capable of obtaining the same basic operation and advantageous effects as the first exemplary embodiment.

Ninth Exemplary Embodiment

Figure 27:
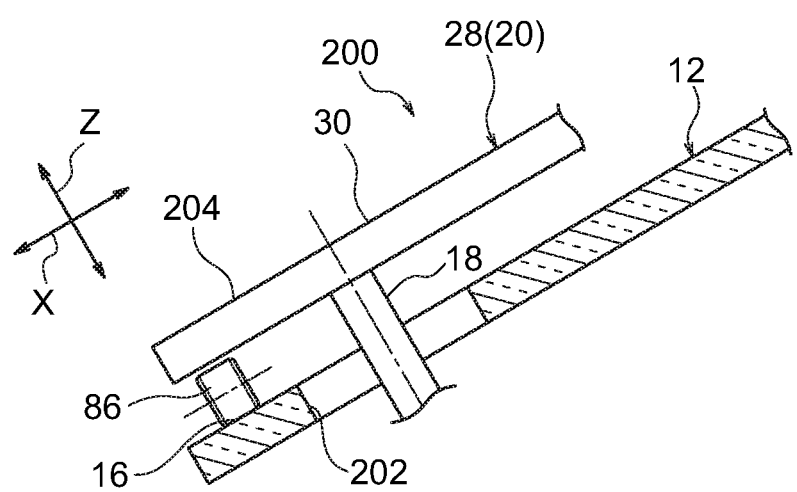
FIG. 27 is a partial cross-section schematically illustrating configuration in a region including part of a wiper device according to a ninth exemplary embodiment of the present disclosure.

FIG. 27 is a partial cross-section schematically illustrating configuration in a region including part of a wiper device 200 according to a ninth exemplary embodiment of the present disclosure. In the wiper device 200, the arm head 30 of the wiper arm 28 is supported by the support shaft 18 that is inserted through a through hole 202 formed in the windshield 12. The arm head 30 includes an extension portion 204 extending toward the opposite side to the wiper blade 22 (not illustrated in FIG. 27) on the other side of the support shaft 18 to the wiper blade 22. The drive wheel 86 is rotatably supported by the extension portion 204. The rotation axial direction of the drive wheel 86 runs in the length direction X of the wiper arm 28, and rotation of the drive wheel 86 is driven by a non-illustrated motor supported by the arm head 30 so as to roll across the running face 16 provided at the windshield 12. The present exemplary embodiment is also capable of obtaining the same basic operation and advantageous effects as the first exemplary embodiment. Moreover, the support shaft 18 can be employed as a fulcrum such that the direction in which contact reaction force on the drive wheel 86 acts can be made to correspond with the direction of pressing force of the wiper arm 28.

Tenth Exemplary Embodiment

Figure 28:
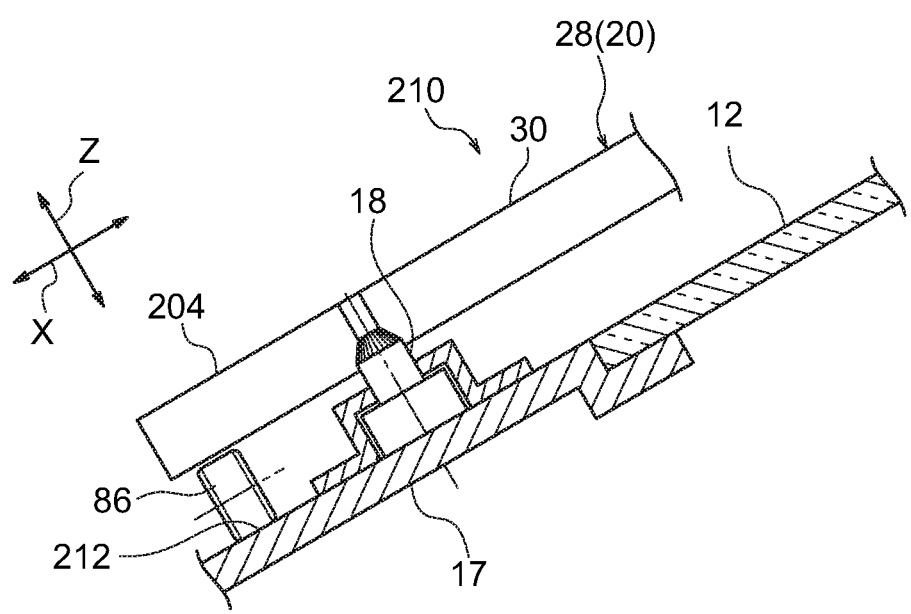
FIG. 28 is a partial cross-section schematically illustrating configuration in a region including part of a wiper device according to a tenth exemplary embodiment of the present disclosure.

FIG. 28 is a partial cross-section schematically illustrating configuration in a region including part of a wiper device 210 according to a tenth exemplary embodiment of the present disclosure. Although the wiper device 210 is configured similarly to the wiper device 200 according to the ninth exemplary embodiment, in the wiper device 210 the drive wheel 86 rolls across a running face 212 provided at a panel configuring part of the front cowl section 17. The present exemplary embodiment is also capable of obtaining the same basic operation and advantageous effects as the first exemplary embodiment.

Supplementary Explanation to the Exemplary Embodiments

Although the wiper member 20 is configured to pivot about the support shaft 18 in the respective exemplary embodiments described above, the present disclosure is not limited thereto. Namely, a base end portion of a wiper arm of a wiper member of the present disclosure may be supported such that the wiper arm is capable of sliding relative to the vehicle. In such cases, the base end portion of the wiper arm is not limited to linear sliding, and may be configured so as to slide in a circular arc shape (curving shape).

Although the drive wheel 86, 118 is configured including the tire portion 92, 122 configured by a rubber-like material in the respective exemplary embodiments described above, the present disclosure is not limited thereto. A drive wheel of the present disclosure may have a gear-toothed profile. In such cases, the running face provided at the vehicle is configured with rack teeth that mesh together with the gear-toothed drive wheel. Alternatively, a caterpillar (crawler) may be mounted to a drive wheel of the present disclosure. In such cases, an idle wheel is supported by the wiper member in addition to the drive wheel.

Although installation is made to the front cowl section 17 or its surroundings in the exemplary embodiments described above, there is no limitation thereto, and placement at a vehicle ceiling, pillar, or the like close to the windshield is also possible.

Various other modifications may be implemented within a range not departing from the spirit of the present disclosure. Obviously, the scope of rights encompassed by the present disclosure is not limited by the exemplary embodiments described above.

What is claimed is:
1. A wiper device comprising:
a wiper member that includes a wiper arm to which a wiper blade is coupled, a base end portion of the wiper arm including an arm head supported by a support section provided at a vehicle, and the wiper member being configured to undergo displacement relative to the vehicle;

a drive wheel that (i) is rotatably supported by the wiper member at a position of the wiper member which is separated from the support section, (ii) is in contact with a running face provided at the vehicle, and (iii) rolls across the running face so as to displace the wiper member relative to the vehicle; and a motor that (i) is supported by the wiper member so as to undergo displacement together with the wiper member, (ii) is accommodated in a housing chamber formed in the arm head, and (iii) drives rotation of the drive wheel.

2. The wiper device of claim 1, wherein the support section is a support shaft, and the wiper member is configured to pivot about the support shaft.

3. The wiper device of claim 1, wherein the running face is provided at a windshield to be wiped by the wiper blade.

4. The wiper device of claim 1, wherein the running face is provided at a rail member attached to the vehicle separately to a windshield to be wiped by the wiper blade.

5. The wiper device of claim 1, wherein a rotation axial direction of the drive wheel runs in a length direction of the wiper member.

6. The wiper device of claim 1, wherein a rotation axial direction of the drive wheel runs in a direction intersecting both a length direction of the wiper member and a direction of displacement of the wiper member.

7. The wiper device of claim 1, wherein the drive wheel is supported by the wiper member via the motor.

8. The wiper device of claim 7, wherein the motor is supported by the wiper member via a suspension device that elastically displaces the drive wheel and the motor, with respect to the wiper member, in response to a reaction force received by the drive wheel from the running face.

9. The wiper device of claim 7, wherein:
the wiper arm includes a retainer coupled to the arm head so as to be pivotable relative to the arm head.

10. The wiper device of claim 1, wherein a portion of the drive wheel configured to contact the running face is made from rubber.

11. The wiper device of claim 1, further comprising:
a position sensor configured to detect a position of the wiper member relative to the vehicle; and
a control section configured to control actuation of the motor based on a detection result of the position sensor.

12. The wiper device of claim 1, further comprising an auxiliary wheel that is rotatably supported by the wiper member, such that a location for forming the running face on the vehicle is interposed between the drive wheel and the auxiliary wheel.

13. The wiper device of claim 1, wherein the running face is provided at a front cowl section of the vehicle.

14. The wiper device of claim 4, wherein:
the support section is a support shaft;
the wiper member is pivotable about the support shaft; and
the rail member is configured by a plate-shaped body that has a spreading fan shape, as viewed along a pivot axis direction of the wiper member, and a circular arc-shaped rail projecting from a circular arc-shaped edge of the plate-shaped body in one direction along the pivot axis direction.

15. The wiper device of claim 5, wherein:
the support section is a support shaft;
the wiper member is pivotable about the support shaft; and
the drive wheel is formed in a truncated circular conical shape that becomes larger on progression toward the leading end side of the wiper arm.

16. The wiper device of claim 6, wherein the motor is a reduction drive-fitted motor.

17. A wiper device comprising:
a wiper member that includes a wiper arm to which a wiper blade is coupled, a base end portion of the wiper arm including an arm head supported by a support shaft provided at a vehicle, and the wiper member being configured to pivot about the support shaft;
a drive wheel that is supported by the wiper member so as to be in contact with a running face of the vehicle and capable of rolling across the running face, the running face provided at the vehicle in a circular arc shape concentric to the support shaft; and
a motor that (i) is supported by the wiper member, (ii) is accommodated in a housing chamber formed in the arm head, and (iii) drives rotation of the drive wheel.

* * * * *